United States Patent
Colcord et al.

(10) Patent No.: US 12,536,181 B2
(45) Date of Patent: *Jan. 27, 2026

(54) SYSTEMS AND METHODS FOR MANAGEMENT OF MULTI-TENANCY DATA ANALYTICS PLATFORMS

(71) Applicant: Fidelity Information Services, LLC, Jacksonville, FL (US)

(72) Inventors: Aaron David Colcord, Mequon, WI (US); Kevin Richard Mellott, Muskego, WI (US); David Vincente Favela, Penngrove, CA (US); Jeffrey Chee-Keong Neong, Windsor, CA (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,415

(22) Filed: Jul. 31, 2024

(65) Prior Publication Data

US 2024/0394262 A1    Nov. 28, 2024

Related U.S. Application Data

(63) Continuation of application No. 17/576,189, filed on Jan. 14, 2022, now Pat. No. 12,086,143, which is a
(Continued)

(51) Int. Cl.
*G06F 16/2457* (2019.01)
*G06F 9/30* (2018.01)
(Continued)

(52) U.S. Cl.
CPC ........ *G06F 16/2457* (2019.01); *G06F 9/3005* (2013.01); *G06F 9/3867* (2013.01);
(Continued)

(58) Field of Classification Search
CPC ........... G06F 16/2457; G06F 16/24573; G06F 16/2471; G06F 16/221; G06F 16/285;
(Continued)

(56) References Cited

U.S. PATENT DOCUMENTS

2015/0264158 A1\* 9/2015 Viswanathan .......... G06F 16/13
709/203
2016/0307210 A1\* 10/2016 Agarwal .......... G06Q 10/06316
(Continued)

*Primary Examiner* — Joshua Bullock
(74) *Attorney, Agent, or Firm* — Finnegan, Henderson, Farabow, Garrett & Dunner, LLP

(57) ABSTRACT

A data analytics system configured to perform operations is disclosed. The operations can include creating, in response to instructions received from a user, a first pipeline. This pipeline can be configured to extract data from an append-only first data store, extract identifying characteristics from the extracted data, provide the identifying characteristics to an identity service, and receive a tenancy identifier from the identity service. The pipeline can further be configured to create a data object in a second data store using the extracted data; create a tenancy object in a metadata store, the tenancy object associated with the data object, the metadata store implementing a hierarchical data object ownership graph; and associate the tenancy object with a parent object in the hierarchical data object ownership graph. The data analytics system can then tear down the first pipeline.

20 Claims, 15 Drawing Sheets

Related U.S. Application Data continuation of application No. 17/011,802, filed on Sep. 3, 2020, now Pat. No. 11,256,702.

(60) Provisional application No. 63/050,107, filed on Jul. 9, 2020.

(51) Int. Cl.

| | | |
|---|---|---|
| *G06F 9/38* | (2018.01) | |
| *G06F 9/54* | (2006.01) | |
| *G06F 16/21* | (2019.01) | |
| *G06F 16/22* | (2019.01) | |
| *G06F 16/2458* | (2019.01) | |
| *G06F 16/28* | (2019.01) | |
| *G06F 21/31* | (2013.01) | |
| *G06F 21/54* | (2013.01) | |
| *G06F 21/60* | (2013.01) | |
| *G06F 21/62* | (2013.01) | |

(52) U.S. Cl.
CPC .............. *G06F 9/541* (2013.01); *G06F 9/544* (2013.01); *G06F 16/211* (2019.01); *G06F 16/221* (2019.01); *G06F 16/24573* (2019.01); *G06F 16/2465* (2019.01); *G06F 16/2471* (2019.01); *G06F 16/285* (2019.01); *G06F 21/31* (2013.01); *G06F 21/54* (2013.01); *G06F 21/602* (2013.01); *G06F 21/6227* (2013.01); *G06F 21/6254* (2013.01); *G06F 2221/2141* (2013.01)

(58) Field of Classification Search
CPC .............. G06F 16/2465; G06F 16/211; G06F 9/3005; G06F 9/3867; G06F 9/541; G06F 9/544; G06F 21/31; G06F 21/54; G06F 21/602; G06F 21/6227; G06F 21/6254; G06F 2221/2141
USPC ........................................................ 707/737
See application file for complete search history.

(56) References Cited

U.S. PATENT DOCUMENTS

| 2018/0150783 A1* | 5/2018 | Xu .................. G06N 3/044 |
| 2019/0095241 A1* | 3/2019 | Ago .................. G06F 9/468 |

* cited by examiner

FIG. 2 Data Architecture

FIG. 3 System Architecture

FIG. 4 Advanced Data Engine

SYSTEMS AND METHODS FOR MANAGEMENT OF MULTI-TENANCY DATA ANALYTICS PLATFORMS

CROSS-REFERENCE TO RELATED APPLICATIONS

This application is a continuation of application Ser. No. 17/576,189 filed Jan. 14, 2022 which is a continuation of application Ser. No. 17/011,802, filed Sep. 3, 2020, now U.S. Pat. No. 11,256,702 issued on Feb. 22, 2022 which claims the benefit of priority to U.S. Provisional Patent Application No. 63/050,107, filed Jul. 9, 2020, the contents of each of which are incorporated herein by reference in its entirety.

TECHNICAL FIELD

The present disclosure relates to a serverless multi-tenancy data analytics platform configured to process parameterized flow specifications and provide analysis results using a variety of interfaces.

BACKGROUND OF THE INVENTION

Existing data analytics platforms are often limited by their architecture. Such platforms may separately handle different data products, segregating data and preventing users from gaining insights based on analysis across multiple data products. Furthermore, such systems may depend on physical infrastructure, such as on-premises server farms or computing clusters, making them difficult to scale. Interacting with such systems may be a complicated and technical process-a user may require multiple years of training or experience before they attain proficiency with a particular platform. Often, existing data analytics platforms are poorly automated, requiring technical specialists attend to the details of extracting and loading new data into the system. Furthermore, such systems may lack the security, data monitoring and lineage tracking capabilities necessary to fulfill regulations or partner requirements concerning the processing or sharing of sensitive data.

SUMMARY

The disclosed systems and methods relate to a platform for providing high-quality, trusted, data-driven insights at scale. The disclosed embodiments support automated deployment and scaling of a serverless data analytics architecture. In some embodiments, the data analytics architecture can be entirely serverless and configured to use storage and compute resources on an as-needed basis, reducing platform resource requirements and expenses. The disclosed embodiments can aid less-technically skilled data analysts by using flows that describe data-processing operations at a high-level. In some embodiments, the envisioned flows can be used in conjunction with separately stored metadata, so that the operation of the flow can depend on the metadata associated with the flow. In turn, in some embodiments, the metadata can be affected by the data processed by the system (in addition to direct user management of the metadata). This data-driven approach to gathering metadata and then processing data based on the gathered metadata can effectively automate at least some of the management of the system, reducing the technical support requirements of the platform. In this manner, the disclosed embodiments constitute a technological improvement over existing data analytics platforms.

The disclosed embodiments include a first data analytics system. This data analytics system can include an append-only first data store accessible to multiple clients and a second data store. The data analytics system can be configurable to, in response to receiving first instructions from a first target system of a first client, the first target system separate from the data analytics system, create a first pipeline between the append-only first data store and the second data store. The first pipeline can be configured according to the first instructions to generate a client-specific data object and store the client-specific data object in the second data store. The data analytics system can be configurable to teardown the first pipeline upon completion of storing the client-specific data object in the second data store.

The first data analytics system can be configurable to, in response to receiving second instructions from a second target system of the first client, the second target system separate from the data analytics system, create a second pipeline between the second data store and the second target system. The second pipeline can be configured according to the second instructions to generate query results using, at least in part, the client-specific data object and provide the query results to the second target system. The data analytics system can be further configurable to teardown the second pipeline upon completing provision of the query results to the second target system.

The disclosed embodiments include a second data analytics system. This data analytics system can include a data repository configured to store data for multiple clients, a metadata repository separate from the data store, an access control system, and a policy store. The data analytics system can be configurable to perform operations. The operations can include automatically generating metadata for data in the data repository using a metadata engine, the metadata including technical metadata and usage metadata. The operations can further include obtaining a client policy governing access to the data, the policy independent of a source or structure of the data. The policy can be obtained by users associated with the client. The operations can further include receiving a request to provide the data from a user associated with the client, the request including instructions to create a pipeline to provide the data, the instructions independent of the source or structure of the data. The operations can further include authorizing, by the access control system, the request based on the policy and the usage metadata. The operations can also include creating the pipeline using the technical metadata and providing the data using the pipeline.

The disclosed embodiments include a third data analytics system. This data analytics system can include at least one processor and at least one computer-readable medium. The computer-readable medium can include instructions that, when executed by the at least one processor, cause the data analytics system to perform operations. The operations can include creating, in response to instructions received from a user, a first pipeline. The figure pipeline can be configured to extract data from an append-only first data store; extract identifying characteristics from the extracted data; provide the identifying characteristics to an identity service and receive a tenancy identifier from the identity service. The first pipeline can further be configured to create a data object in a second data store using the extracted data. The first pipeline can also be configured to create a tenancy object in a metadata store, the tenancy object associated with the data object, the metadata store implementing a hierarchical data object ownership graph. The first pipeline can be configured to associate the tenancy object with a parent object in the hierarchical data object ownership graph. The operations can include tearing down the first pipeline following completion of creation of the data object, creation of the tenancy object, and association of the tenancy object with the parent object.

The disclosed embodiments include a fourth data analytics system. This data analytics system can include at least one processor and at least one non-transitory computer-readable medium. The computer-medium can contain instructions that, when executed by the at least one processor, cause the data analytics system to perform operations. The operations can include creating at least one data storage; creating a metadata store separate from the at least one data storage; and creating a flow storage. The operations can further include configuring a flow service using first received instructions. The flow service can be configured to obtain a first flow from the flow storage; obtain metadata from the metadata storage; and execute the flow. Flow execution can include obtaining input data from at least one data storage and generating output data at least in part by validating, transforming, and serializing the input data using the metadata. Flow execution can further include generating additional metadata describing the output data. Flow execution can also include providing the output data for storage in the at least one data storage and providing the additional metadata for storage in the metadata storage.

The disclosed embodiments include a fifth data analytics system. This data analytics system can include at least one processor; and at least one non-transitory computer-readable medium. The computer-readable medium can contain instructions that, when executed by the at least one processor, cause the data system to perform operations. The operations can include receiving, at a first storage location, input data. The operations can further include configuring a flow service to execute a flow. Flow execution can include creating a pipeline using the flow and metadata associated with the flow, the pipeline configured to perform a data transformation specified in the flow. Flow execution can further include determining a tenancy associated with the input data using the flow. Flow execution can also include generating, using the pipeline, output data from the input data; and storing, using the pipeline, the output data in a second storage location associated with the tenancy.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to the present embodiments, examples of which are illustrated in the accompanying drawings. Wherever possible, the same reference numbers will be used throughout the drawings to refer to the same or like parts.

The disclosed embodiments concern data analytics systems capable of processing and storing data on behalf of multiple tenants. The data can be received from many difference sources and can be processed using a flow language that supports sophisticated access and control of the data, while being useable by programmers with limited experience. Data can be secured using access controls based on a flexible system of tenancies that permits permissions to be changed through modifications to metadata without rewriting or recreating the data. Additional metadata can be used to configure the flow language, so that execution of the same flow may yield different results, depending on changes to metadata associated with the flow. The disclosed data analytics systems can also be configured to provide data to a range of different endpoints using many different interfaces (e.g., oData API, Open API, GraphQL, SOAP, XML-RPC, or the like). The system is designed for reliability and scalability, using an infrastructure as code approach to ensure that resources (e.g., compute and storage) can be scaled and consumed as needed. In some embodiments, the functionality described with regards to at least some of the data analytics systems described herein can be combined into a single data system. In various embodiments, different data systems can implement differing subsets of the functionality described herein.

1. Overview

Figure 1:
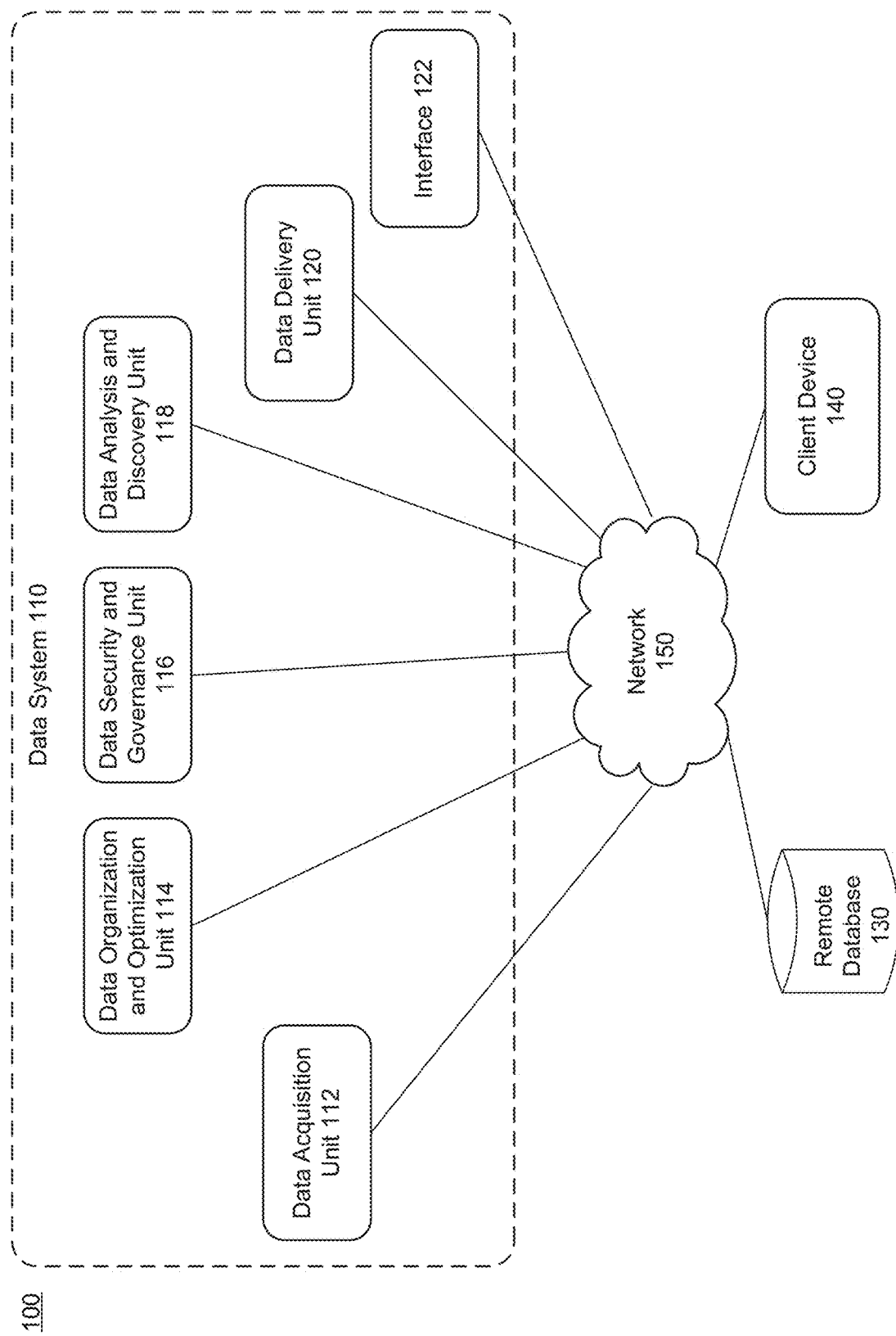
FIG. 1 depicts a schematic diagram illustrating an environment in which embodiments of the present disclosure may be implemented.

FIG. 1 is a schematic diagram illustrating an environment 100 in which embodiments of the present disclosure may be implemented. Environment 100 may include a data system 110, a remote database 130, and a client device 140. Components of environment 100 may be communicatively connected to each other using a network 150.

Data system 110 may be a platform on which products configured to support intake, analysis, and query of large amount of data in real-time may be built. Data system 110 may include a data acquisition unit 112, a data organization and processing unit 114, a data security and governance unit 116, a data analysis and discovery unit 118, a data delivery unit 120, and an interface 122. These components of data system 110 can be configured to communicate with each other, or with external components of data system 110, using network 150.

Data acquisition unit 112 may be configured to acquire structured, semi-structured, and unstructured data from various sources via network 150, and store the acquired data in a local data storage (not pictured). Data organization and processing unit 114 may be configured to organize and optimize the data acquired by data acquisition unit 112 by using various data science tools. Data security and governance unit 116 may be configured to manage the availability, usability, integrity, and security of the data in data system 110, based on internal data standards and policies. Data analysis and discovery unit 118 may be configured to analyze the data in data system 110 in response to one or more queries from client device 140. Data delivery unit 120 may configured to deliver the analysis and discovery result generated by data analysis and discovery unit 118 to client device 140. Interface 122 may be configured to manage interactions between data system 110 and other systems (e.g., remote database 130, client device 140) using network 150.

Each one of data acquisition unit 112, data organization and processing unit 114, data security and governance unit 116, data analysis and discovery unit 118, and data delivery unit 120 may include one or more cloud computing instances configurable to perform their respective functions. The cloud computing instances may be general-purpose computing devices, or special-purpose computing devices, such as graphical processing units (GPUs) or application-specific integrated circuits. The computing devices can be configured to host an environment for performing designated functions. For example, the computing devices can host virtual machines, pods, or containers. The computing devices can be configured to run applications for performing designated functions.

Remote database 130 may include one or more databases configured to store data for use by system 100, consistent with disclosed embodiments. Remote database 130 may be configured to store datasets and/or one or more dataset indexes, consistent with disclosed embodiments. Remote database 130 may include a cloud-based database (e.g., Amazon RDS™) or an on-premises database.

Client device 140 may include one or more memory units and one or more processors configured to perform operations consistent with disclosed embodiments. In some embodiments, client device 140 may include hardware, software, and/or firmware modules. Client device 140 may be a user device. Client device 140 may include a mobile device, a tablet, a personal computer, a terminal, a kiosk, a server, a server cluster, a cloud service, a storage device, a specialized device configured to perform methods according to disclosed embodiments, or the like.

The particular arrangement of components depicted in FIG. 1 is not intended to be limiting. Environment 100 may include additional components, or fewer components. In addition, data system 110 may include additional components, or fewer components.

2. Data Architecture

Figure 2:
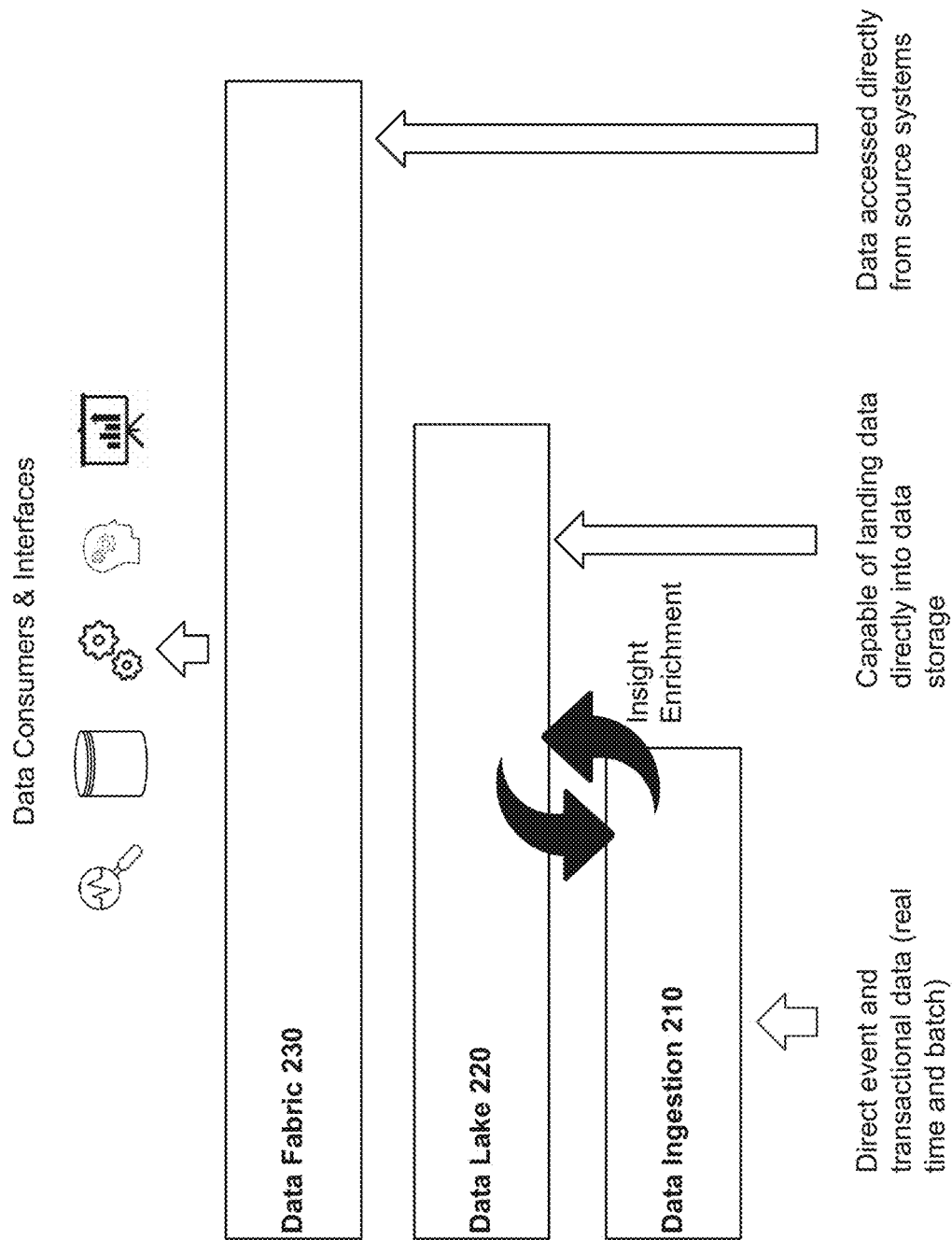
FIG. 2 depicts a schematic diagram illustrating a data architecture employed in data system illustrated in FIG. 1, consistent with the embodiments of the present disclosure.

FIG. 2 is a schematic diagram illustrating a data architecture 200 employed in data system 110 illustrated in FIG. 1, consistent with the embodiments of the present disclosure. Data architecture 200 includes three fully-decoupled, horizontal scalable tiers including a data ingestion layer 210, a data lake 220, and a data fabric 230. The disclosed embodiments are not necessarily limited to such an architecture.

Data ingestion layer 210 may be configured to ingest data received from a variety of input data sources. For example, the data ingested by data ingestion layer 210 may include direct event and transactional data. The data may be ingested in real-time, or in batches. During ingestion, data ingestion layer 210 may organize and optimize the received data to enrich the data with insights (e.g., recognize relationships between different datasets).

Data lake 220 may store enriched data received from data ingestion layer 210. Additionally, in some embodiments, data lake 220 may land data directly received from the input data sources without being ingested by data ingestion layer 210.

Data fabric 230 may store data accessed directly from a variety of source systems. The source systems may include a local data source within the same institution where data system 110 operates (e.g. a database maintained by the entity that maintains data fabric 230) and/or include external data sources external to the institution (e.g., databases of customers or clients that are accessible through a federated database layer). The data stored in data fabric 230 can be analyzed and organized using Structured Query Language (SQL) queries, big data analytics, full text search, real-time analytics, and machine learning.

The data from data ingestion layer 210, data lake 220, and data fabric 230 may be provided to data consumers via interfaces.

3. System Architecture

Figure 3:
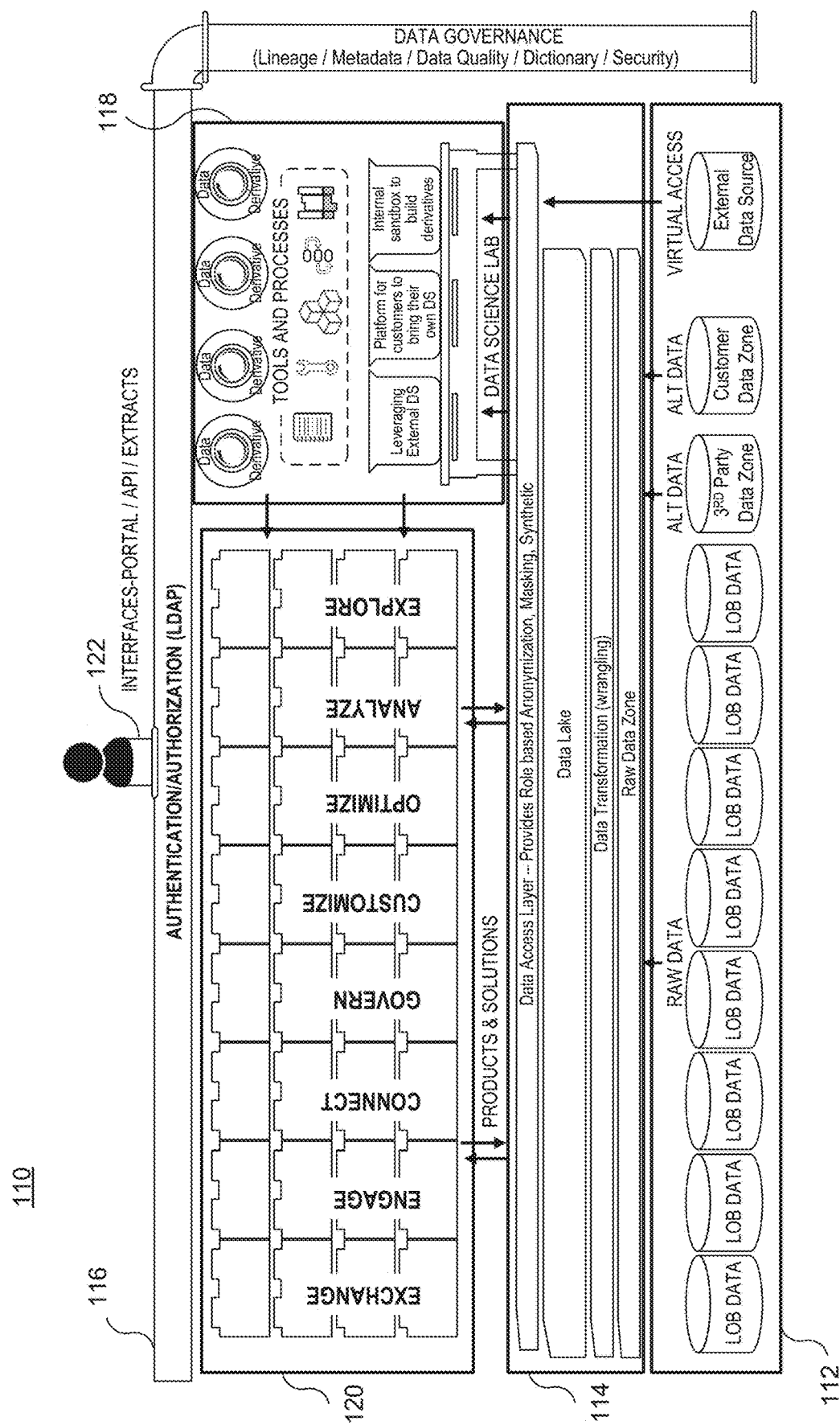
FIG. 3 depicts a schematic diagram illustrating a system architecture for data system illustrated in FIG. 1, consistent with the embodiments of the present disclosure.

FIG. 3 is a schematic diagram illustrating a system architecture for data system 110 illustrated in FIG. 1, consist with the embodiments of the present disclosure. As discussed above, data system 110 may include data acquisition unit 112, data organization and processing unit 114, data security and governance unit 116, data analysis and discovery unit 118, data delivery unit 120, and interface 122. These components of data system 110 can be configured to communicate with each other, or with external components of data system 110, using network 150.

Data acquisition unit 112 may be configured to acquire various types of data from various sources. The data acquired by data acquisition unit 112 may include raw data, alternative (ALT) data, and data obtained from external data sources via virtual access. The "raw data" may refer to minimally processed or unprocessed data. The raw data may include large object (LOB) data obtained from internal data sources located within the same institution where data system 110 operates. The raw data may include different types of data elements, such as events, Customer Lifecycle Management (CLM) data, and data files. The ALT data may include data which is not within traditional data sources. In some instances, the ALT data may be logically divided into divisions including a third party data zone and a customer data zone. The third party data zone may include, but is not limited to, application usage data, transaction data generated from email receipts, geo-location data, data from public resources, satellite data, sell-side data, social media data, weather data, web data, web traffic data, etc. The customer data zone may include, but is not limited to, transaction data generated from customer information (e.g., identification, address, employment status, employment history, credit and debit cards, etc.).

Data organization and processing unit 114 may be configured to organize or process the data acquired by data acquisition unit 112 using various data science tools. Data organization and processing unit 114 may include a raw data zone for storing the raw data and the ALT data acquired by data acquisition unit 112. Data organization and processing unit 114 may transform the data in the raw data zone from a "raw" data format into another format. This second format may be more appropriate for downstream processes such as data analysis and discovery. The transformed data may be stored in a data lake (e.g., such as data lake 220) associated with data organization and processing unit 114. Data organization and processing unit 114 may further include a data access layer which provides at least one of role-based anonymization, masking, or synthesizing of at least one of (i) the data in data lake or (ii) the data acquired by data acquisition unit 112 from the external data source via virtual access.

Data security and governance unit 116 may be configured to manage at least one of the lineage, metadata, quality, data dictionary, or security of the data in data system 110, based on at least one of internal data standards or policies that also control data usage. Data security and governance unit 116 may be configured to control access to data system 110 by authenticating a wide category of users, authorizing users to perform specific actions, and protecting data in data system 110, both in transit and at rest. In some embodiments, data security and governance unit 116 may use a Lightweight Directory Access Protocol (LDAP) to control access to data system 110.

Data analysis and discovery unit 118 may be configured to analyze the data in data system 110 in response to one or more queries from client device 140. Data analysis and discovery unit 118 may employ a data science lab to analyze the structured or unstructured data from the data access layer in data organization and processing unit 114. Data analysis and discovery unit 118 may also leverage an external data system containing any form of structured or unstructured data, to perform the analysis. The external data system may be provided by an internal or external partner. Data analysis and discovery unit 118 may provide a platform for customers to onboard their own data system(s). Data analysis and discovery unit 118 may also provide a sandbox enabling users to design and test applications or data products. Data analysis and discovery unit 118 may support such design and testing using a variety of tools and processes.

Data delivery unit 120 may be configured to deliver data products to data consumers. Such data products can include those generated by data analysis and discovery unit 118. The data consumers can be or include client device 140. The data products may include, but are not limited to, a data exchange product, a customer engagement product, a data connection product, a data governance product, a data customization product, a data optimization product, a data analysis product, and a data exploration product.

Interface 122 may be configured to manage interactions between data system 110 and other systems (e.g., remote database 130, client device 140, etc.) using network 150. Interface 122 may be implemented by a portal, an API, or an extract interface.

4. Advanced Data Engine

Figure 4:
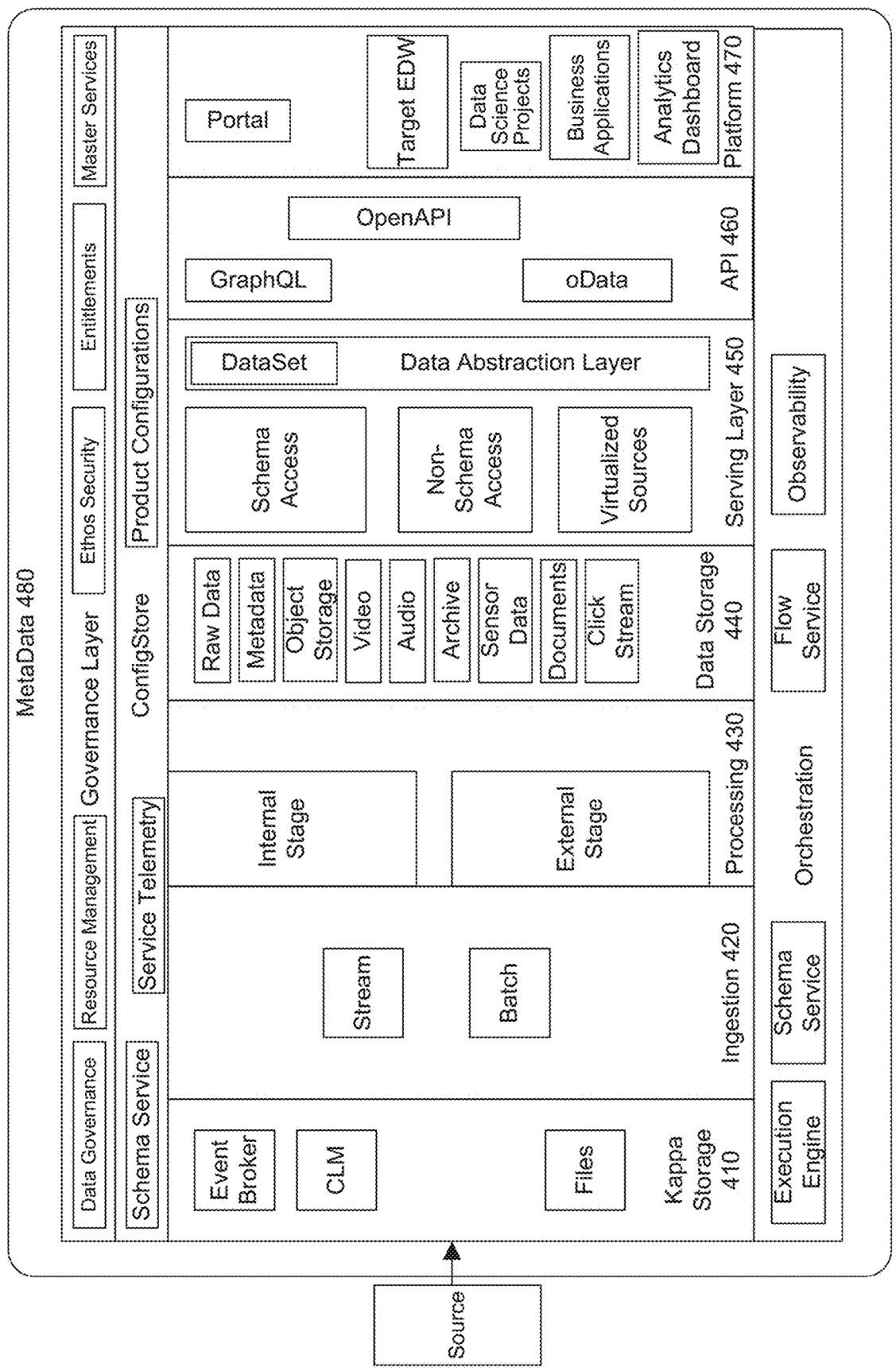
FIG. 4 depicts a schematic diagram illustrating an advanced data engine (ADE), which may be implemented using data system, illustrated in FIG. 1, consistent with the embodiments of the present disclosure.

FIG. 4 is a schematic diagram illustrating an advanced data engine (ADE) 400, which may be implemented using data system 110, illustrated in FIG. 1, consistent with the embodiments of the present disclosure. ADE 400 may include a kappa storage 410, an ingestion layer 420, a processing layer 430, a data storage 440, a serving layer 450, an API layer 460, and a platform 470.

Kappa storage 410 may be configured to store raw data received from raw data sources. The raw data may be retained in kappa storage 410 in its original form, without being processed or with minimal processing. Kappa storage 410 may apply a predetermined retention policy to the raw data elements, to map the raw data elements into locations corresponding to original sources of the raw data elements. In this manner, further processing (e.g., analysis, optimization, organization, delivery, etc.) and/or re-processing of a raw data element may be performed by retrieving the data element from its corresponding storage location. In some embodiments, Kappa storage 410 is implemented using an "immutable" or "append-only" data management pattern (e.g., such as used in a Kappa Architecture or Lambda architecture, or as used in similar architectures based on Redux, or the like). In some embodiments, Kappa storage 410 may be configured to handle streaming input (in such embodiments, ADE 400 may be configured to preferentially receive streaming data). However, the disclosed embodiments are not limited to such an architecture. Some embodiments may implement Kappa storage 410 using mutable data storage that supports deletion and updating of data. In some embodiments, Kappa storage 410 may store the data, while the data analytics system generated or stores metadata describing the nature and location of the stored data.

Ingestion layer 420 may be configured to ingest steam data or batch data. The batch data may refer to data with set boundaries. For example, the boundary may be time, and the batch data may include data of a week, a date, or a month. The data stream may refer to data without set boundaries. In some instances, ingestion layer 420 may be configured to create artificial boundaries to the data stream to extract artificial data batches from the data stream, thereby creating windows to allow users to look into the data stream.

Processing layer 430 may be configured to process the data ingested by ingestion layer 420. Once data is transformed via a flow service (e.g., as described herein), the data can be transformed or preserved as a stream of data. In some instances, ADE 400 may look at data as a stream natively. The processing by processing layer 430 may be performed by using two major mechanism of staging: an internal staging and an external staging. Powered by the combination of internal staging and external staging, ADE 400 may create a raw data copy and a refined data copy through either the external or internal staging. In the internal staging, all work may be optimized in memory in one pass. The external staging may ensure that data that requires enhancement is pushed through logically consistent means to maintain high throughput. Specifically, in an internal stage, the data ingested by ingestion layer 420 may be processed under a first process to generate a first processed object. In the meantime, an event (e.g., user request) may occur which may require processing layer 430 to process the data under a second process different from the first process. In this case, processing layer 430 may transmit the data to a different processing system or device from the processing system that performed the first process. That processing system or device may perform the second process in an external stage to generate a second processed object. The first processed object and the second processed object, however, may be combined by ADE 400 as one cohesive piece. The processing in the internal stage and the external stage may also be asynchronized to each other.

Data storage 440 may be configured to store the processed objects received from processing layer 430. In addition, data storage 440 may store structured and unstructured data. For example, the data stored in data storage 440 may be raw data, metadata, data objects, video data, audio data, archived data, sensor data, documents, click streams, or the like.

Serving layer 450 may be a dynamic transformation layer for data storage layer 440. Data may be transformed based on internal security rules and information from the flow service. Serving layer 450 may handle, two major areas of data sources: normal structured data (schema) and data that may not contain a schema (non-schema). Serving layer 450 may include a data abstraction layer.

API layer 460 may be the primary mechanism of interaction inside and outside of the core components of ADE 400. API layer 460 may convert all serving layer components into consumption external to platform 470. API layer 460 may be configured to support query interfaces such as GraphQL, OpenAPI, oData API, or the like.

Platform 470 may support multiple technologies seamlessly like one integrated product. An integral part of platform 470 is a portal that brings together the various cores, extensions, and data components together in a shared, responsive design. Platform 470 may be configured with various tools to deliver the data. The tools may include analytics dashboards, target enterprise data warehouse (EDW), data science tools, and business applications.

ADE 400 may be managed by a metadata layer 480. Metadata layer 480 may support the ability of the system to remain as automated and hands-off as possible. Without a robust Metadata layer, data storage 440 might quickly descend into a data swamp or resemble a data puddle. A data swamp is the essential components of a data lake without a uniform management system. A data puddle is similar except a management system exists but is controlled by legacy extract, transform, and load (ETL) processes. Both of data swamp and data puddle resembles patterns where critical elements of managing the information of the data lake is externalized in some form. The management of the data swamp may exist in a user's mental space. The data puddle may implement the ETL toolset implement. In contrast, metadata layer 480 may allow the capability to enable automated organization of the system and to expand and integrate new capabilities such as security. A data lake relies upon effective metadata management layer to enable the dynamic transition of the main organization zones of a lake. All data should be managed by the system at every zone.

5. Data Analytics System

Figure 5:
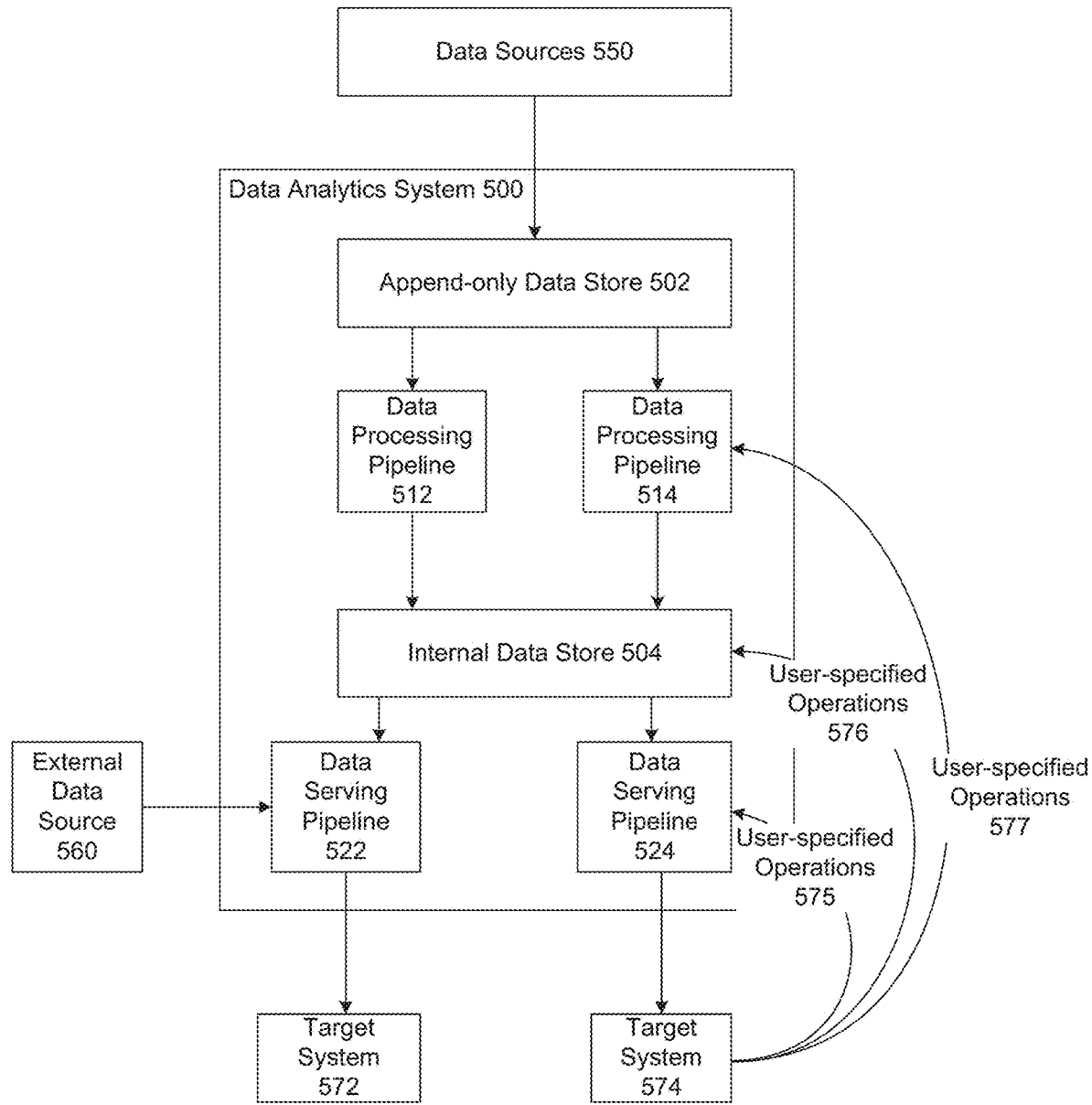
FIG. 5 depicts a schematic diagram illustrating a data analytics system, consistent with embodiments of the present disclosure.

FIG. 5 is a schematic diagram illustrating a data analytics system 500, consistent with embodiments of the present disclosure. As illustrated in FIG. 5, data analytics system 500 includes an append-only data store ("first data store") 502 accessible to multiple clients, and an internal data store ("second data store") 504. Data analytics system 500 may be communicatively coupled with data sources 550, an external data source 560, and one or more target systems associated with one or more clients. For illustrative purposes, FIG. 5 illustrates target systems 572 and 574 coupled with data analytics system 500.

Data analytics system 500 may be implemented using a computing system. The computing system can be or include a cloud computing system configured to provide the disclosed functionality (e.g., a cloud computing system configured to support infrastructure as a service, platform as a service, container as a service, compute as a service, function as a service, or the like). The computing system can be or include an on-premises computer or computer cluster configured to provide the functionality disclosed herein.

Data sources 550 may include data streams, centralized and distributed data at rest, and external data sources accessible to data analytics system 500. Extract, transform, and load (ETL) tools known in the art may be used to automatically, semi-automatically, or manually onboard the data from the data sources 550 into append-only first data store 502.

Append-only data store 502 may serve as the repository of data from which clients obtain the data that they are interested in. Append-only data store 502 may be architectured as a "write once-read many times" data source. Append-only data store 502 may be implemented using Kappa.

Data system 500 may implement one or more data processing pipelines ("first pipeline"). For illustrative purposes, FIG. 5 illustrates data processing pipelines 512 and 514. Data processing pipelines 512 and 514 may be implemented as a service. In some instances, a client can instruct data system 500 to execute one or more operations specified in a high-level language (e.g., JSON, or the like). In executing the operations, data analytics system 500 may create an infrastructure necessary to perform the data processing (e.g., using an infrastructure as code approach) and then use the created infrastructure to perform the data processing. The operation can be configured to tear down the infrastructure once the processing is complete (e.g., to free resources for servicing other client requests). The operations can be specified at varying levels of granularity. In some instances, the operations can be created using one or more functions exposed by data analytics system 500 on a function-as-a-service basis. Different clients can configure data analytics system 500 with different data processing pipelines.

Data processing pipelines 512 and 514 may generate data objects for internal data store 504 from the data stored in append-only data store 502. Such generation may include validation, aggregation, filtering, classification, transformation, coding, or similar data processing operations. Data analytics system 500 may be configured to associate the generated objects with metadata indicating the context of generation of the object (e.g., what client created/controls/owns the object; when the object was created; security information for the object such as ACLs, distribution policies, encryption keys, or the like; when the object was last accessed; or other suitable metadata).

Internal data store 504 may store the data objects generated by data processing pipelines 512 and 514 for the users. Data objects for a client may be managed in internal data store 504 using one or more operations specified by the client in a high-level language (e.g., JSON). In some embodiments, internal data store 504 may be architecture as a data lake.

External data source 560 may be a database or datasource logically or logically and physically separate from the internal data store. For example, external data source 560 may be a data source or API exposed by data providers (e.g., Square™).

Data system 500 may implement one or more data servicing pipelines ("second pipelines"), which can be implemented similar to the data processing pipelines 512 and 514. For illustrative purposes, FIG. 5 illustrates data servicing pipelines 522 and 524. Data servicing pipelines 522 and 524 may handle queries into internal data store 504 and external data source 560. In some instances, data servicing pipelines 522 and 524 may virtualize external data source 560. Data servicing pipelines 522 and 524 may perform validation, aggregation, filtering, classification, transformation, coding, or similar data processing operations on data obtained from internal data store 504 or external data source 560. Data servicing pipelines 522 and 524 may include storage for caching query results for improved performance.

One or more target systems 572 and 574 may be associated with each client. Target systems 572 and 574 may be logically and/or physically separated from data analytics system 500. Target systems 572 and 574 may host or implement programs that consume data from data system 500. In some embodiments, such programs can include API calls to data system 500 that cause data system 500 to generate infrastructure, perform data processing using the infrastructure to generate an API result, provide the result, and teardown the infrastructure to free up resources. Target systems 572 and 574 may include mobile devices, clouds-hosted systems, servers, desktops, etc. The programs hosted in, or implemented by, target systems 572 and 574 may include data science tools like Jupyter Notebooks, Tableau, or other suitable programs.

Figure 6:
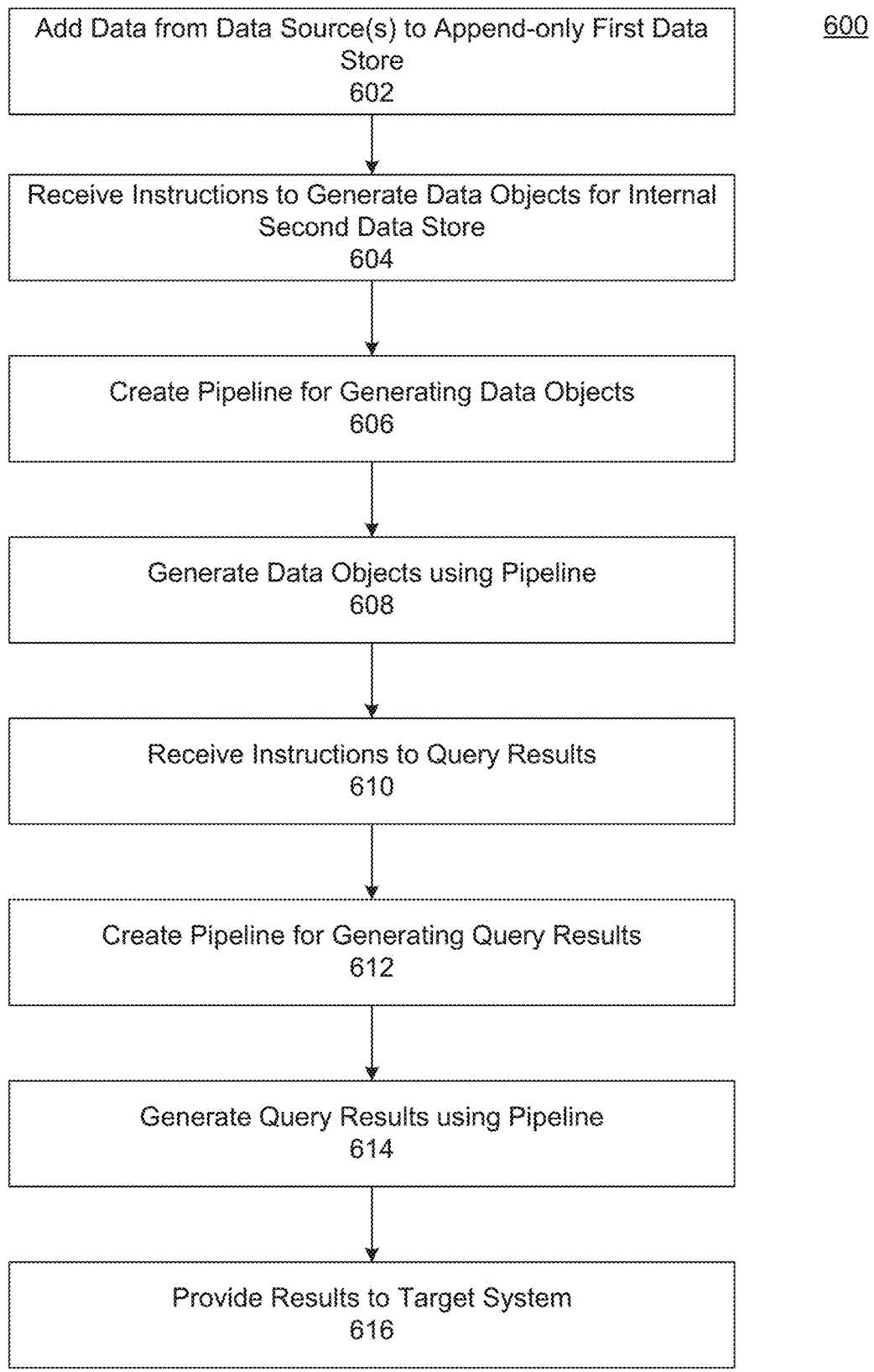
FIG. 6 depicts a flowchart illustrating a process implemented by the data analytics system of FIG. 5, consistent with embodiments of the present disclosure.

FIG. 6 is a flowchart illustrating a process 600 implemented by data analytics system 500, consistent with embodiments of the present disclosure.

As illustrated in FIG. 6, at step 602, data analytics system 500 may add data from data sources 550 to append-only data store 502. In some embodiments, data analytics system 500 may be configured to load information received from data sources 550 into append-only data store 502 in response to privileged instructions. At step 604, data analytics system 500 may receive instructions ("first instructions") to generate client-specific data objects for internal data store 504. The first instructions may be sent by a first target system (e.g., target system 572 or 574) associated with a first client.

At step 606, data analytics system 500 may create a data processing pipeline ("first pipeline", e.g., data processing pipeline 512 or 514) for generating client-specific data objects according to the first instructions. In some embodiments, the first instructions may include a declarative specification of the data processing pipeline 512 or 514. The first instructions may also include a template personalized with metadata. In some embodiments, the first instructions may include a function call and the data analytics system 500 may generate first infrastructure instructions for creating the data processing pipeline 512 or 514 to implement the function call.

At step 608, data analytics system 500 may generate client-specific data objects using data processing pipeline 512 or 514 and store the generated data objects in internal data store 504. Data processing pipeline 512 or 514 may be configured to generate the client-specific data object by performing at least one of validation, aggregation, filtering, classification, transformation, or coding operations. Data processing pipeline 512 or 514 may also be configured to associate a context with the client-specific data object. The context may specify at least one of the first client, information describing data processing pipeline 512 or 514, or security information for the client-specific data object. Upon completion of storing the generated data objects in internal data store 504, data analytics system 500 may teardown the data processing pipeline created at step 606.

At step 610, data analytics system 500 may receive instructions ("second instructions") to query results. The instructions may be sent by a second target system (e.g., target system 572 or 574) associated with the first client. The first target system and the second target system may be different target systems, or may be the same target system.

At step 612, data analytics system 500 may create a data servicing pipeline ("second pipeline", e.g., data servicing pipeline 522 or 524) for generating query results according to the instructions received at step 610. At step 614, data analytics system 500 may generate query results using data servicing pipeline 522 or 524. In some embodiments, data servicing pipeline 522 or 524 may be configured to accept data from multiple data stores (e.g., internal data store 504, and/or external data source 560) and generate query results based on the accepted data. In some embodiments, data servicing pipeline 522 or 524 may be configured, according to the second instructions, to provide virtualized access to external data source 560 and generate the query results using, at least in part, the virtualized access to external data source 560.

At step 616, data analytics system 500 may provide the generated query results to second target system 572 or 574. Upon completion of the provision of the query results to second target system 572 or 574, data analytics system 500 may tear down the data servicing pipeline created at step 612.

In some embodiments, data analytics system 500 may be configurable to create pipelines accepting data from multiple data sources 550 and provide query results based on the accepted data to multiple target systems 572 and 574.

In some embodiments, data analytics system 500 may be configurable to generate, in response to a privileged query, at least one of information describing data objects for multiple clients stored in internal data store 504, information describing data processing pipelines 512 and 514 created by clients between append-only data store 502 and internal data store 504, or information describing data servicing pipelines 522 and 524 created by clients between internal data store 504 and target systems 561 and 562 of the clients. In some embodiments, such a privileged query may be made by a superuser or administrator. For example, a user associated with the provider of data analytics system 500 may be authorized to query data analytics system 500 for such information. In various embodiments, a user associated with a client may be able to query data analytics system 500 for information describing data objects for that client, information describing data processing pipelines and created by that client between append-only data store 502 and internal data store 504, and information describing data servicing pipelines and created by that client between internal data store 504 and target systems and of that client.

6. Data Analytics System Using Metadata

Figure 7:
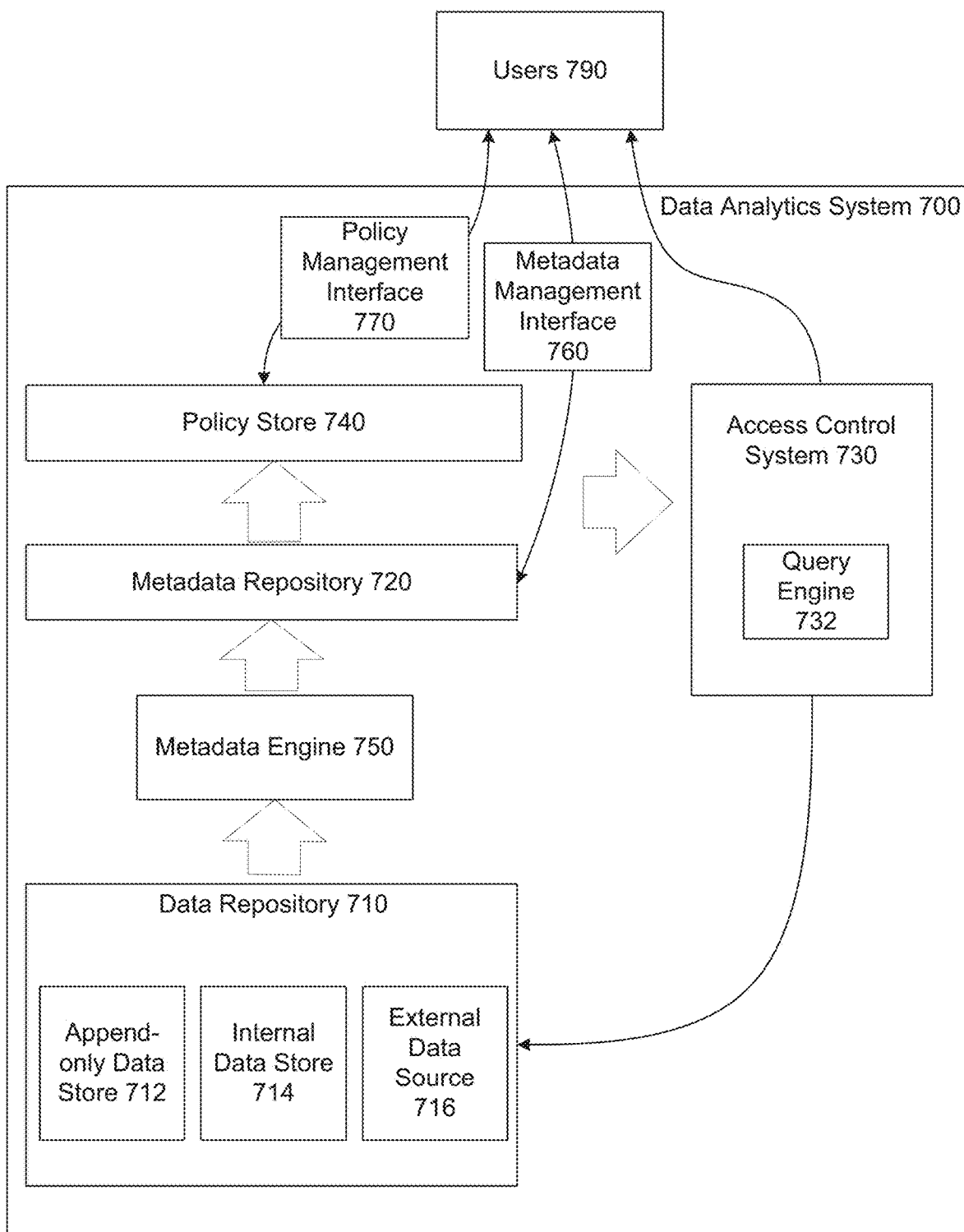
FIG. 7 depicts a schematic diagram illustrating a data analytics system, consistent with embodiments of the present disclosure.

FIG. 7 is a schematic diagram illustrating a data analytics system 700, consistent with embodiments of the present disclosure. As illustrated in FIG. 7, data analytics system 700 may include a data repository 710 configured to store data for multiple clients, a metadata repository 720 separate from data repository 710, an access control system 730, a policy store 740, a metadata engine 750, a metadata management interface 760, and a policy management interface 770. The data stored in data repository 710 may include data in an append-only data store 712 (e.g., data store 502) and an internal data store 714 (e.g., internal data store 504, which may be architectured as a "data lake").

Data analytics system 700 may provide virtualized access to an external data source 716. Thus, the data stored in data repository 710 may include external data stored in the external data source 716. Although FIG. 7 illustrates external data source 716 as disposed inside data analytics system 700, external data source 716 may be logically and physically separated from data analytics system 700. Data analytics system 700 may be accessed by users 790 remotely.

Data analytics system 700 may be implemented using a computing system. The computing system can be or include a cloud computing system configured to provide the disclosed functionality (e.g., a cloud computing system configured to support infrastructure as a service, platform as a service, container as a service, compute as a service, function as a service, or the like). The computing system can be or include an on-premises computer or computer cluster configured to provide the functionality disclosed below.

Data analytics system 700 may be configurable to use metadata to manage data in append-only data store 712, internal data store 714, or views (e.g., objects in a database defined by a query and providing or containing the results of the query) into internal data store 714 generated by user. The metadata may be stored in metadata repository 720, which can be separate from data repository 710, where the data is stored. In some embodiments, metadata may be changed (e.g., metadata variables may be added or removed, the values of metadata variables may be added, deleted, or modified), without changing the values of the data.

In some embodiments, the ability to change metadata may be role-dependent. In some instances, a user in an administrator role may be able to change the metadata (either directly or by changing the rules governing generation or assignment of the metadata), while a user in a client role (or the like) may be unable to change the metadata. However, a user in a client role may be able to change policies that govern access to data based on metadata associated with the data. In this manner, users 790 can change who has access to the data, while ensuring that the metadata consumed by the policies has a consistent and easily understood meaning, thereby improving the ability to review or audit polices. In various instances, a user in a client role may be able to change the metadata associated with data through a request to an administrator. In some embodiments, metadata can include automatically generated metadata and client-generated metadata. In such embodiments, clients may be able to modify client-generated metadata but not automatically generated metadata.

Data analytics system 700 may be configured to automatically generate metadata by running metadata engine 750 against the data stored in data repository 710. Metadata engine 750 may generate the metadata using classifiers, such as machine learning models, pattern engines, regular expressions, and the like. Metadata may concern the content of the data (e.g., the values of the data) or the structure of the data (e.g., the schema, physical layout, origin, or the like). Metadata engine 750 may run against structured or unstructured data.

Metadata can be manually or semi-manually generated by tagging data. Data can be tagged by administrators or clients. Manual tags can indicate a metric (e.g., a data analysis output, such as number of accounts on file, accounts inactive in last 30 days, finance and fee income, or the like) or a dimension (e.g., a characteristic or context of the data, such as unit, source, type, project, or the like).

Data analytics system 700 may be configured to classify the metadata generated by metadata engine 750. In some embodiments, the classification may be a separate step from generating the metadata. For example, data analytics system 700 may apply rules to the metadata to identify and classify the metadata as business, usage, and technology metadata. In some instances, for example, metadata engine 750 may detect financial information or personally identifiable information in the data. For example, metadata engine 750 may detect social security numbers in a table (e.g., in a column of a table) or phone numbers, usernames, or passwords in customer support logs. Metadata engine 750 may generate usage metadata for such sensitive information. The usage metadata may be consumed by policies governing access to the data. Or the policies may cause data analytics system 700 to provide the data encrypted, replace the data with synthetic data, or obscure or obfuscate the data. In this manner, the data can be automatically secured as it is incorporated into append-only data store 712, internal data store 714, or views of the data. In various embodiments, classification may be inherent in the generation of the metadata. For example, metadata concerning the structure of the data may be created as technical metadata, without requiring any further classification step. Similarly, metadata indicating the existence of personally identifiable information may be created as usage metadata, without requiring any further classification step.

Data analytics system 700 may be configured to integrate metadata corresponding to data from multiple sources (e.g., data from multiple clients, multiple systems or databases, or the like). Integrating the metadata can include standardizing the metadata or otherwise transforming the metadata to be consistent with a predefined schema. Such integration may be performed as a separate step after generating the metadata, or can be inherent in the generation of the metadata.

Policy store 740 may be configured to store policies that are generated to govern access to data based on the metadata associated with the data. Policies can be specified at a high level, independent of the source or structure of the data. For example, a policy can prohibit a user in a designated role from accessing "sensitive" data. The policy need not specify the columns containing the sensitive data, or what makes the data sensitive. In this non-limiting example, "sensitive" can be a value of usage metadata, which can be associated with data by metadata engine 750; or manually or semi-manually, through tagging.

Access control system 730 may be configured to enforce the policies using the metadata associated with the data. Access control system 730 may include a query engine 732, such as Presto™ or the like, configured to handle requests for structured data. Access control system 730 may include a proxy server configured to handle requests for unstructured data such as documents, images, or the like.

Data analytics system 700 may be configured to provide metadata management interface 760 for managing metadata. Clients 790 may interact with metadata management interface 760 to manage and explore the metadata for one or more data items. For example, metadata management interface 760 may be configurable to enable a user to tag data with metadata or manage rules associating metadata with data. Metadata management interface 760 may be configurable to display at least a portion of quality metadata for the data. For example, metadata management interface 760 may indicate a profile for the data, as described herein. The profile may include a quality score for data or one or more attributes of the data (e.g., fields of an object, columns of a relational database, document types in a document-orient database. or the like). Metadata management interface 760 may include descriptions of data quality measures relevant to the data or attribute(s) and depict scores for those data quality measures. When metadata management interface 760 provides information specific to an attribute of the data, metadata management interface 760 may enable a user to switch between different attributes. Attribute specific information can include high-level metadata describing the attribute (e.g., data source, data lineage, field name or column number; data type; number of missing values; min, max, average or modal value; or the like). Metadata management interface 760 may enable the user to drill down into the data and identify values driving the quality scores (e.g., missing values, or the like).

Data analytics system 700 may be configured to provide a policy management interface 770 for managing policies. Policy management interface 770 for managing policies may be separate from metadata management interface 760 for managing metadata, as illustrated in FIG. 7. Alternatively, policy management interface 770 may be part of, or include, metadata management interface 760 for managing metadata. Policy management interface 770 may be configurable to enable a user associated with the client to specify policies for accessing the data. Policy management interface 770 may allow clients to define roles or other groups of users, associate data access policies with those groups, manage existing policies, and generate data about existing policies or the data governed by existing policies. In some embodiments, data analytics system 700 may create or update the policy in response to user interaction with policy management interface 770, and may store the policy in policy store 740.

Data analytics system 700 may be configured to provide a user monitoring interface (not shown in FIG. 7) for monitoring usage of the system by clients. This interface can be configurable to indicate the data being accessed, the users (or roles or groups) accessing the data, and the policies under which or in accordance with which the data is being accessed. Thus, the user monitoring interface may be configurable to enable a user associated with the client to identify the data as being accessed, identify the user as accessing the data, and identify the policy as being the policy according to which the data is being accessed.

Metadata generated by data analytics system 700 may include one or more of the following metadata types: technical metadata, business metadata, usage metadata, quality metadata.

Technical metadata may include data lineage or physical implementation metadata. Data lineage metadata may include metadata describing the original source(s) and/or processes used to generate the data. For example, lineage metadata can indicate what databases were the origin of data stored in the immutable datastore. As an additional example, lineage metadata may indicate the operations performed in a pipeline used to generate data object stored in the data lake from the immutable data store. As a further example, lineage metadata may indicate the operations performed in a pipeline used to generate query results from stored data objects, or indicate an external source of a query result or that a data from an external source was used to generate a query result. For example, lineage metadata may map from a metric (e.g., accounts on file, receipts, or the like) to the data used to generate or update the metric. In some instances, the mapping may be to the physical or logical location(s) of the data. For example, the metric "Monthly Sales" may map to the values of an attribute stored in a set of documents in the data lake. As a further example, the lineage metadata may describe how to process the data to generate the metric. Physical implementation metadata may include physical or logical schemas, data types, formats, or other characteristics of how the data is represented.

Business metadata may include a name associated with the data (e.g., "social security number", "transaction log", "first name", or the like). In some embodiments, business metadata may include a description of the metadata, or other business-specific information concerning the data. In various embodiments, business metadata may include mappings or descriptions (e.g., purpose for which the data is created or consumed, or the like) associating data stored in the immutable data store, data lake, or view with a business usage or process or with other stored date in the immutable data store, data lake, or view.

Usage metadata may include metadata governing access to data. Usage metadata may support access based on roles, data sources, products related to the data, clients generating or using the data, or the like. Usage metadata may support policies limiting access consistent with regulatory, privacy, contractual data access, or authorization rules.

Quality metadata may include profiles or scores for data. Data analytics system 700 may be configured to generate the profiles or scores for the data. A profile may include multiple scores addressing different characteristics the data. A profile may include a description or context for the scores. The quality scores may be based on subjective or objective measures. Quality scores may be client-specific or depend on client-specific feedback or requirements. Subjective measures and objective measures may be scored according to criteria developed through surveys or other methods of obtaining client or user feedback. Additionally or alternatively, objective measures may be automatically evaluated, for example by applying rules concerning the characteristics of the data, or through verification of data against third-party reference data.

The subjective measures may include:
existence measures indicating that data is reflective of meaningful events, objectives and ideas to the business has been collected;
usability measures indicating that business process(es) and/or individuals understand and are able to use the data to achieve goals;
clarity measures indicating the data has a unique, defined meaning and can be easily interpreted;
believability measures indicating that the data is deemed credible by those using it;
objectivity measures indicating that the data is unbiased and impartial and not dependent on the judgment, interpretation, or evaluation of individuals; and
relevancy measures indicating that the data is applicable to one or more business process or decision.

The objective measures may include:
scarcity measures indicate that the data is proprietary, secret and difficult to come by;
timeliness measures indicate that the data is updated and available in time to meet business requirements;
precision measures indicate that the data is recorded with the precision required by business processes or decision;

accessibility measures indicate that the data is readily retrieved and/or integrated into business processes or decisions;

validity measures indicate that the data accurately represents reality, possibly qualified by a verifiable source;

uniqueness measures indicate that the data that exists in multiple places has the same value;

completeness measures indicate that records are not missing fields and datasets are not missing instances;

integrity measures indicate that the appropriate links and relationships exist among data; and consistency measures indicate that data that exists in multiple locations is similarly represented and/or structured.

Data analytics system 700 may be configured to calculate the one or more quality scores based on the values of the subject and objective measures. The one or more quality scores can be a function of the subject and objective measures, such as a sum, average, or weighted average.

Figure 8:
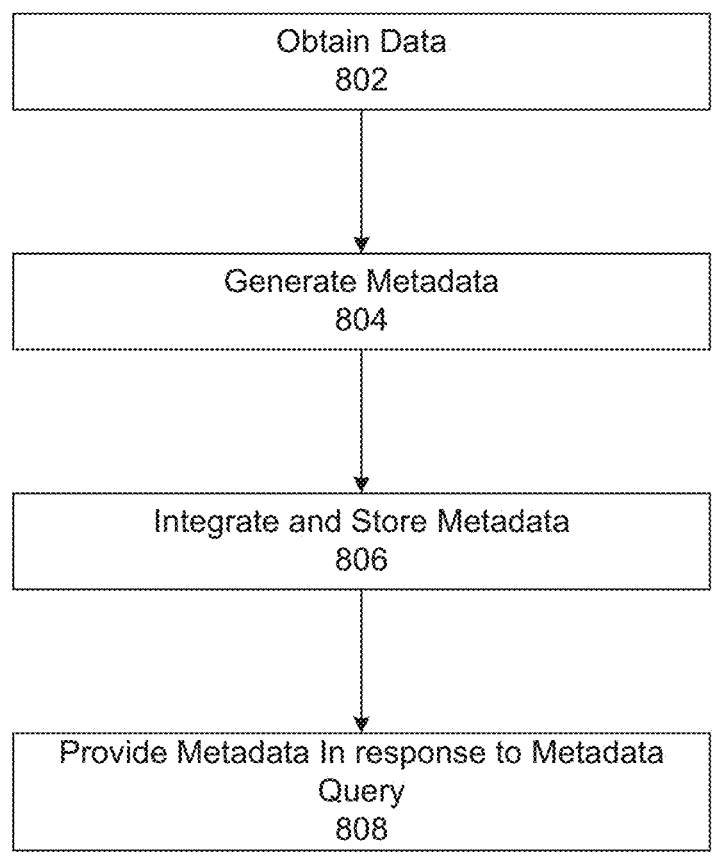
FIG. 8 depicts a flowchart illustrating a process implemented by the data analytics system of FIG. 7, consistent with embodiments of the present disclosure.

FIG. 8 is a flowchart illustrating a process 800 implemented by data analytics system 700, consistent with embodiments of the present disclosure. Data analytics system 700 can be configured to perform process 800 to generate metadata and then provide the metadata in response to a user query.

As illustrated in FIG. 8, at step 802, data analytics system 700 may obtain data and store the obtained data in data repository 710. For example, data analytics system 700 may execute a pipeline that retrieves data from a first data store of the data repository (e.g., an append-only data store, or the like, configured to serve as a backup or long-term data store) and store the data in a second data store of the data repository (e.g., a data lake or the like). As an additional example, data analytics system 700 may execute a pipeline that enhances data already stored in the second data store (or data retrieved from an external data source through a federated database layer, or the like) and stores the enhanced data back in the second data store.

At step 804, data analytics system 700 may automatically generate metadata for data in data repository 710 using metadata engine 750. For example, the metadata engine may create or update a schema associated with the data. In some embodiments, the pipeline can be associated with the schema, and the data generated by the pipeline can inherit this association. In various embodiments, metadata engine 750 can be configured to apply rules for associating semantics with the data. These rules can include rules for identifying sensitive or otherwise protected data, rules for associating data with a particular product or role, rules for associating data with a particular business metric (e.g. a rule might associate a column in a table with indirect selling expenses, or cost of goods sold, or the like) or business outcome (e.g., a rule may label a column in a table as containing data useful in predicting whether a customer is likely to be a repeat customer, a desirable customer, or an undesirable customer). The metadata may include technical metadata, business metadata, usage metadata, or other metadata types described herein. At step 806, data analytics system 700 may integrate and store the metadata in metadata repository 720. For example, data analytics system 700 may standardize the metadata or otherwise transform the metadata to be consistent with a predefined schema. While depicted as a separate step from generation of the metadata in step 804, such integration may be inherent in the generation of the metadata. At step 808, data analytics system 700 may provide metadata in response to a metadata query. For example, data analytics system 700 may provide the metadata in response to a query received using the metadata management interface 760, or the like.

Figure 9:
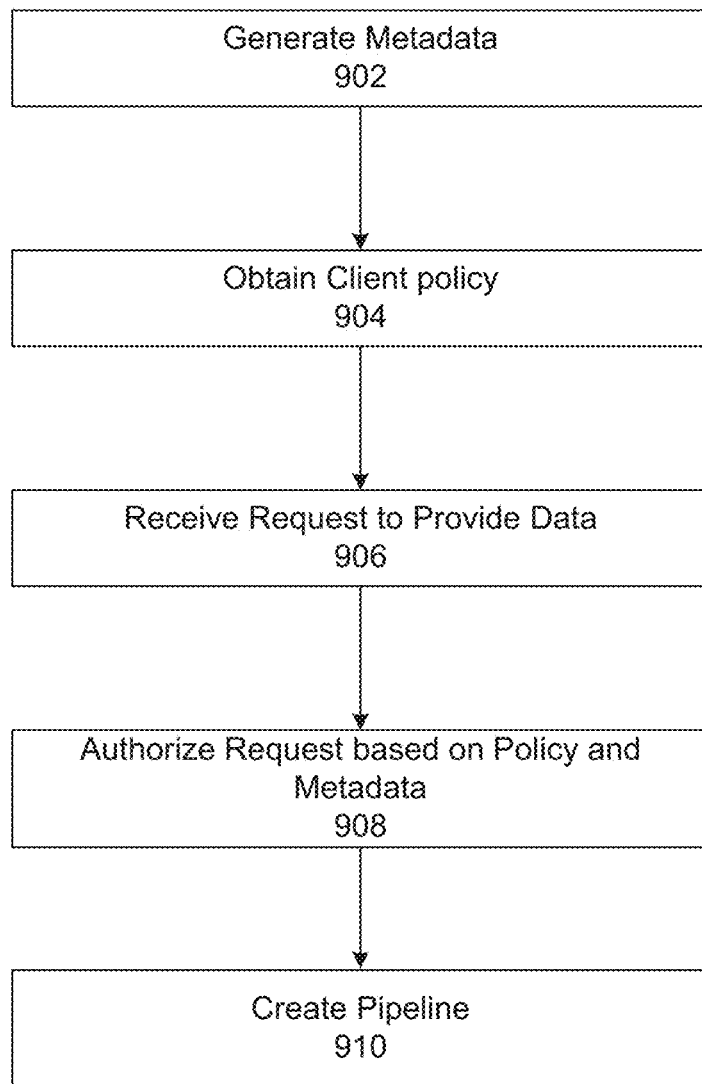
FIG. 9 depicts a flowchart illustrating a process implemented by the data analytics system of FIG. 7, consistent with embodiments of the present disclosure.

FIG. 9 is a flowchart illustrating a process 900 implemented by data analytics system 700, consistent with embodiments of the present disclosure. Data analytics system 700 can be configured to perform process 900 to generate data objects (or a view of a data object).

As illustrated in FIG. 9, at step 902, data analytics system 700 may automatically generate metadata for data in data repository 710 using metadata engine 750. The metadata may include technical metadata and usage metadata. For example, metadata engine 750 may be configured to automatically generate or update a schema for the data in data repository 710. As an additional example, metadata engine 750 may include rules for associating semantics with data (e.g., tagging data as sensitive, such as personal identifying information, or as otherwise subject to special processing rules, such as data governed by regulatory or contractual guidelines).

At step 904, data analytics system 700 may obtain a client policy governing access, by users associated with the client, to the data in data repository 710. In various embodiments, the policy can be obtained from another system, or developed through interactions between one or more users and data analytics system 700. The policy may be independent of a source or structure of the data in data repository 710. In some instances, the policy may specify restrictions on access to the data at a high level. For example, the policy might specify that a user is prohibited from accessing sensitive data, without defining what makes data sensitive. Instead, metadata engine 750 may be configured to determine whether the tag or identifier "sensitive" is associated with a particular item of data. Similarly, the policy might specify that a user may only access data related to one or more projects or user roles, without enumerating the data related to those projects or roles. The association of the data with the user roles or projects may be handled by metadata engine 750.

At step 906, data analytics system 700 may receive a request to provide the data from a user associated with a client. The request may include instructions to create a pipeline to provide the data. In some embodiments, the instructions are independent of at least one of the source or structure of the data. For example, the instructions may refer to the data by an identifier. Metadata (e.g., technical metadata) may associate this identifier with a location in the data analytics system. In some embodiments, the metadata may be stored in metadata repository 720. As an additional example, the data may not be stored with any schema describing the semantics of the data. Instead metadata (e.g., a schema or the like) can be obtained during creation or execution of the pipeline (e.g., from metadata repository 720). In some embodiments, the schema can be obtained by a schema service.

At step 908, access control system 730 may authorize the request based on the policy and the usage metadata. For example, access control system 730 can verify that usage metadata associated with the request data satisfies the access control policies. In some instances, access control system 730 can be configured to verify that the client associated with the user requesting the data owns or otherwise is authorized to access the data. For example, access control system 730 can analyze a hierarchical data ownership graph to determine whether an object representing or associated with the client is a direct or indirect parent to a tenancy object associated with the data in the hierarchical data ownership graph. In various instances, access control system 730 can determine whether metadata restricts access to the data (e.g., as sensitive or associated with a particular product or role) and whether the policy permits the user to access data with such restrictions. Should the access control system deny the request, method 900 may terminate. Otherwise, method 900 may proceed to step 910.

At step 910, data analytics system 700 may create the pipeline using the technical metadata and provide the data using the pipeline. In some embodiments, the pipeline may create data objects for storage in internal data store 714 using data in append-only data store 712. The pipeline may also create metadata for the data objects for storage in metadata repository 720. In some embodiments, the pipeline may create a view of the data object for provision to a device of the user.

In some embodiments, the usage metadata may indicate that the data should be provided at least one of encrypted, replaced with synthetic data, or obscured or obfuscated. In such a case, at step 910, data analytics system 700 may configure the pipeline, based on the usage metadata, to provide the data as indicated (e.g., at least one of encrypted, replaced with synthetic data, and obscured or obfuscated).

In some embodiments, the technical metadata may include lineage metadata specifying a mapping from a metric to the data in data repository 710. The instructions included in the request to provide the data received at step 906 may specify the metric. The pipeline created at step 910 may process the data according to the lineage metadata to create or update a value of the metric.

7. Data Storage and Security

In a conventional architecture, a view may be created for a data system. Permissions may be associated with the view, establishing a binary yes/no right for each user to access the entire view. Access to data in the database may be controlled by selecting whether to include the data in a particular view, or whether to grant users access to the particular view. If the data is included in the particular view, then everyone with access to the particular view can access that data. However, when the data changes, or ownership of the data changes, it may be necessary to modify the data according to the view, or a new view may be created, which may consume computational resources.

In order to solve the problems described above, according to embodiments of the present disclosure, when data is being processed in a data system to generate data objects, an extensible tagging mechanism may be used to apply a tag (referred to as "tenancy objects") to each data object. A tag may represent an ownership associated with the data. The data system may implement a hierarchical data object ownership graph comprising a plurality of tenancy objects arranged as parent objects and child objects. A user permitted to access a parent object is permitted to access data objects associated with all child objects of the parent object in the hierarchical data object ownership graph.

According to some embodiments of the present disclosure, all data received by a system is first stored in a Kappa storage, in which data is not accessible to any external user except for internal users of the system. The data in the Kappa storage can be used to resupply the data system for processing or reprocessing the data.

In some embodiments, structured data that arrivedinto the system and successfully passed processing stages may initially be stored inside a raw zone (also known as a "Stage0 table"). The data stored in the raw zone may be as raw as possible that can be correctly consumed into the system. The system treats the data in the raw zone as immutable and does as little to change the data except to validate an initial serialization into the system.

Data arriving in the Kappa zone may have different sources (e.g., different organizations, financial institutions, and/or sub-divisions of financial institutions, etc.), and may concern different subsidiaries (e.g. "Credit Card Corp") or platforms (e.g., "Debit Card Platform" or "IBS Core") or products (e.g., "Loyalty"). The data may be separated according to different sources, subsidiaries, platforms, or products, and the separated data may be stored in different granular zones (hereinafter referred to as "tenant zones"). Access permissions for different tenants may be assigned to each tenant zone.

In some embodiments, a tenant zone may be implemented using separation of data into different storage locations, which can be hosted on logically or physically separate systems (e.g., different virtual machines or different physical machines). In some embodiments, in addition to being hosted in physically or logically separate locations, data may still be still be tagged with a tenancy identifier. In some embodiments, data stored in a tenancy may be unique for each tenant, but may not be unique across tenancies. As described herein, an initial tagging may indicate the tenant zone in which each data object will be stored.

Figure 10:
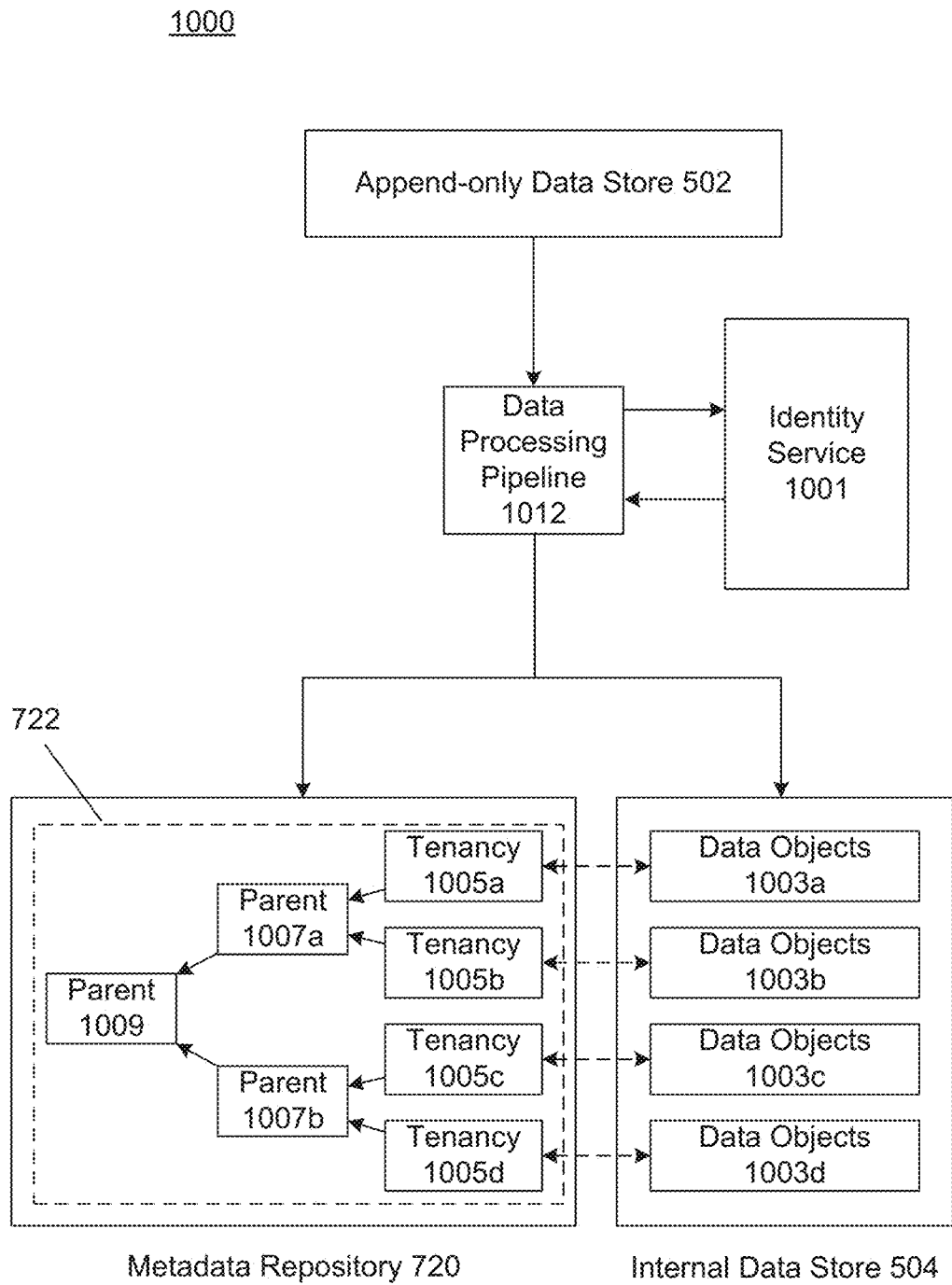
FIG. 10 depicts an exemplary data analytics system configured to secure data using a system of tenancies, consistent with embodiments of the present disclosure.

FIG. 10 is a schematic diagram illustrating a data analytics system 1000, consistent with embodiments of the present disclosure. As illustrated in FIG. 10, data analytics system 1000 may include append-only data store 502 ("first data store"), internal data store 504 ("second data store"), metadata repository 720 ("metadata store"), and an identity service 1001.

Append-only data store 502 may serve as the repository of data directly received from the clients. As described previously with respect to FIG. 5, append-only data store 502 may be architectured as a "write once-read many times" data source. Append-only data store 502 may be implemented as a Kappa zone. Data stored in append-only data store 502 may contain identifying characteristics of the data. The identifying characteristics may represent data lineage, category, steward, product, client organization, etc., of the data. For example, the identifying characteristics may include an organization code of the data.

Data analytics system 1000 may implement a data processing pipeline 1012 that may extract data from append-only data store 502, generate data objects using the extract data, and store the generated data objects in internal data store 504. For illustrative purposes, FIG. 10 illustrates data objects 1003a, 1003b, 1003c, and 1003d.

The data processing pipeline 1012 may also create a tenancy object for the data object. The tenancy object may be appended to the data object and may be stored in metadata repository 720. For illustrative purposes, FIG. 10 illustrates tenancy objects 1005a, 1005b, 1005c, and 1005d respectively corresponding to data objects 1003a, 1003b, 1003c, and 1003d.

The data processing pipeline 1012 may create the tenancy object for the data object based on the identifying characteristics of the extracted data. For example, the data processing pipeline 1012 may extract identifying characteristics from the extracted data, and receive or generate a tenancy identifier according to the identifying characteristics.

In some embodiments, the data processing pipeline 1012 may receive the tenancy identifier from identity service 1001. Identity service 1001 may store a plurality of tenancy identifiers respectively corresponding to a plurality of identifying characteristics. Data processing pipeline 1012 may provide the identifying characteristics of the extracted data to identity service 1001, and identity service 1001 may provide the tenancy identifier associated with the identifying characteristics.

In some embodiments, identify service 1001 does not include the identifying characteristics contained in the extracted data. In this case, data processing pipeline 1012 may create a new tenancy identifier and store the tenancy identifier in association with the identifying characteristics. Alternatively, the tenancy identifier may be manually created for the extracted data.

In metadata repository 720, the tenancy objects may be organized according to a hierarchical data object ownership graph 722 implemented by metadata repository 720. For example, in hierarchical data object ownership graph 722 illustrated in FIG. 10, tenancy objects 1005*a* and 1005*b* may be associated with a parent object 1007*a*; tenancy objects 1005*c* and 1005*d* may be associated with a parent object 1007*b*; and parent objects 1007*a* and 1007*b* may be associated with a parent object 1009. By way of example, parent object 1009 may identify an organization, a financial institution, or a holding company; each one of parent objects 1007*a* and 1007*b* may identify a subdivision of the organization, financial institution, or holding company identified by parent object 1009; and each one of tenancy objects 1005*a*, 1005*b*, 1005*c*, and 1005*d* may identify a subsidiary, a platform, or a product of the corresponding subdivision identified by its parent object.

According to hierarchical data object ownership 722, a user permitted to access a parent object may be permitted to access data objects associated with all child tenancy objects of the parent object.

The association between the tenancy objects and the parent objects, or between parent objects, may be configured according to a user instruction. For example, an internal user of data analytics system 1000 may instruct system 1000 to disassociate a tenancy object with its parent object and associate the tenancy object with a second parent object in the hierarchical data object ownership graph.

Figure 11:
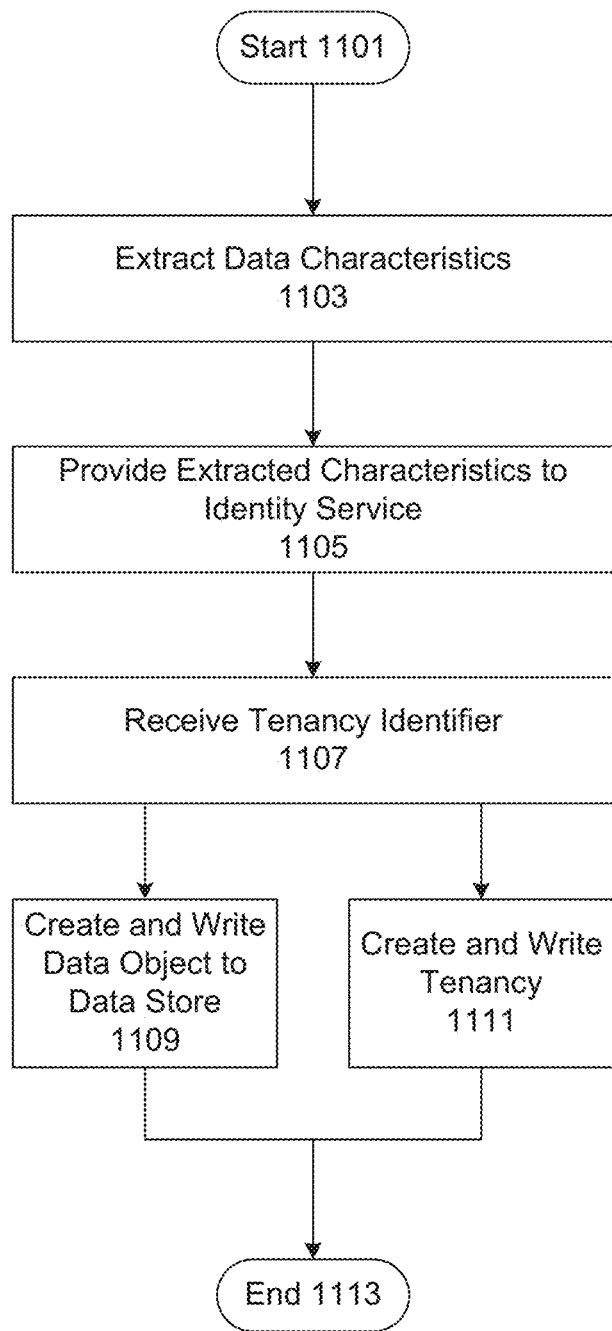
FIG. 11 depicts a flowchart illustrating a process implemented by the data analytics system of FIG. 10, consistent with embodiments of the present disclosure.

FIG. 11 is a flowchart illustrating a process 1100 implemented by data analytics system 1000, consistent with embodiments of the present disclosure.

As illustrated in FIG. 11, process 1100 starts at 1101. At step 1103, data processing pipeline 1012 may extract data from append-only first data store 502 and extract identifying characteristics from the extracted data. For example, the processing pipeline may be configured with one or more locations in the extracted data. The identifying characteristics may be or include values stored at these locations (E.g., one or more columns may include organization codes, or the like, that indicates an organization that owns or maintains the data). At step 1105, data processing pipeline 1012 may provide the identifying characteristics to identity service 1001. At step 1107, data processing pipeline 1012 may receive a tenancy identifier from identity service 1001. At step 1109, data processing pipeline 1012 may create a data object using the extracted data, and write the created data object in internal data store 504. At step 1111, data processing pipeline 1012 may create a tenancy object using the tenancy identifier and write the created tenancy object in metadata repository 720. Data processing pipeline 1012 may also associate the tenancy object with a parent object in the hierarchical data object ownership graph. In some embodiments, following completion of creation of the data object, creation of the tenancy object, and association of the tenancy object with the parent object, data processing pipeline 1012 may be torn down. In some embodiments, the data processing pipeline may persist and handle processing or multiple sets of input data. Then, process 110 may end at step 1113.

8. Flow Processing Service

As described above with regards to FIG. 5, a data system consistent with disclosed embodiments can be configured to process data using pipelines. Such pipelines can be implemented as a service, with the infrastructure necessary to execute the pipeline being created as needed (e.g., according to a schedule, in response to an event or request, or the like). The pipelines can be created in response to or based on instructions received by the data system.

Figure 12:
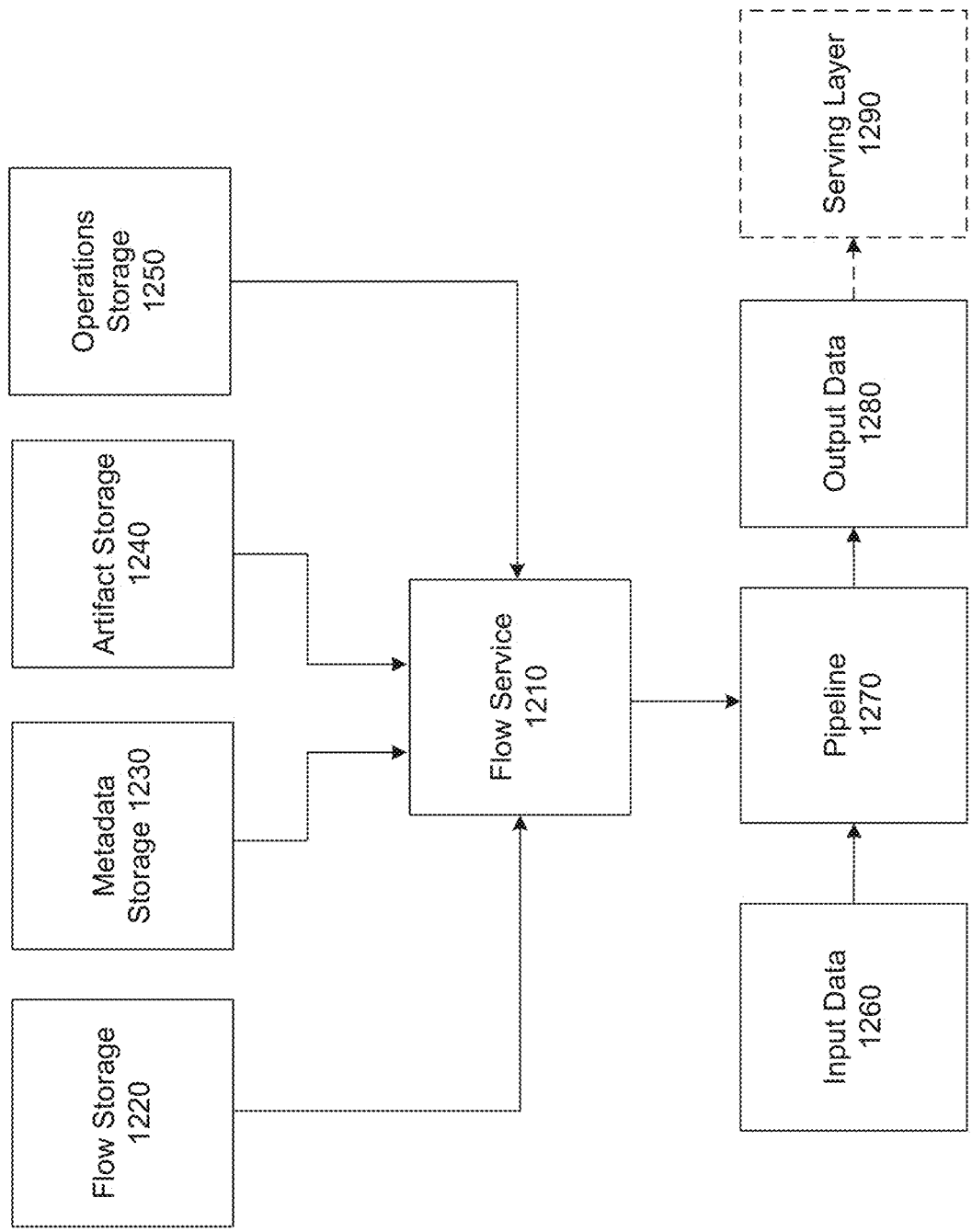
FIG. 12 depicts an exemplary architecture for creating data processing pipelines, consistent with embodiments of the present disclosure.

FIG. 12 depicts an exemplary architecture for creating data processing pipelines consistent with disclosed embodiments. Flow service 1210 can be configured using a flow retrieved from flow storage 1220. In some instances, flow service 1210 can be further configured using at least one of metadata retrieved from metadata repository 1230, artifact objects retrieved from artifact storage 1240, or operation objects retrieved from operation storage 1250. Flow service 1210 can be configured to generate a pipeline for processing input data 1260 into output data 1280. As described herein, the architecture depicted in FIG. 12 can improve the scalability and reliability of the data system. For example, a failure of flow service 1210 need not affect the other components. Additional instances of flow service 1210 can be started without reference to a current state of an existing instance of flow service 1210 (e.g., when additional pipelines need to be created or when an existing instance of a flow service has failed). In this manner, the architecture depicted in FIG. 12 provides a technical improvement over existing architectures.

At least some of the components depicting in FIG. 12 can be created using an infrastructure-as-code approach. In some embodiments, the data system can be configured to consume a declarative specification describing a configuration of one or more of the components depicted in FIG. 12. For example, a YAML or JSON file describing the configuration of flow service 1210 can be consumed by an infrastructure-as-code application (e.g., Terraform, AWS CloudFormation, or the like) to create flow service 1210 on a cloud computing platform. Alternatively, one or more of the components depicted in FIG. 12 can be manually created or configured.

In some embodiments, one or more of the components depicted in FIG. 12 can be implemented as microservices. Such components can be at least one of independently deployable (e.g., with regards to other components of a data system), run in their own processes, or communicate with other components of the data system over a network (not shown in FIG. 12) through service calls.

In some embodiments, flow service 1210 can be configured to be stateless (e.g., flow service 1210 may not maintain a state between calls). Instead, as described herein, the output of flow service 1210 can depend on the configuration of flow service 1210. An instance of flow service 1210 can be started (or an existing instance of flow service 1210 can be configured) in response to receipt of instructions by the data system. The instructions can specify a flow for execution by flow service 1210. Flow service 1210 can obtain the flow from flow storage 1220. For example, flow service 1210 can request the flow from flow storage 1220 in response to received instructions. As an additional example, flow storage 1220 can push the flow to flow service 1210 in response to received instructions. As described in greater detail with respect to FIG. 13, a flow can be an object specifying data source(s), data processing operation(s), and data sink(s).

The instructions (or flow) can specify metadata, artifacts, or operations associated with the flow. Flow service 1210 can obtain any specified metadata from metadata storage 1230, obtain any specified artifact from artifact storage 1240, or obtain any specified operation from operation storage 1250. For example, flow service 1210 can request the metadata, artifact(s), or operation(s) from metadata storage 1230, artifact storage 1240, or operation storage 1250, respectively, in response to received instructions (or as specified by the flow). As an additional example, metadata storage 1230, artifact storage 1240, or operation storage 1250 can push the metadata, artifact(s), or operation(s), respectively, to flow service 1210.

Flow service 1210 can be configured to generate the data processing pipeline using the received flow and any received metadata, artifacts, or operations. In some embodiments, the data system can convert the flow (parameterized by any metadata, artifacts, or operations) into a declarative specification describing the pipeline. The declarative specification can be consumed by a cloud computing platform (e.g., Amazon AWS, Microsoft Azure, IBM Cloud, or the like) to produce the pipeline. As a non-limiting example, the declarative specification can be or include a terraform specification or AWS CloudFormation. Pipeline components (not shown, as in some embodiments deployments can depend on the flow and the metadata associated with the flow) can provide data (e.g., by Kinesis Stream or Firehose, Kafka, or the like), data storage (e.g., Amazon Web Services S3 buckets, Delta Lake, Snowflake, or the like), data processing and analysis (e.g., Databrick managed Spark clusters, Apache Airflow, or the like), schema detection (e.g., delta lake engine, or the like), metadata generation or tagging (e.g., Privacera or the like), or the like.

Flow storage 1220 can be configured to store flows. Flows can be stored as objects. For example, flows can be stored as JSON, YAML, or similar objects. In some embodiments, flow storage 1220 can be implemented as repository. Flow storage 1220 can be configured to support at least one of versioning, permissions, source control, package management, or similar functionality typically provided by repositories. Flow storage 1220 can comprise a database. In some embodiments, the database can be a document-oriented database (e.g., a MongoDB database, DynamoDB database, or the like). In some embodiments, flow storage 1220 can store flow groups, which can be objects defining logically related groups of flows (e.g., flows concerning the same product, flows concerning certain functionality, or the like). The data system can be configured to support create, read, update, and delete operations on flow stored in Flow Storage 1220. Such operations can be performed by users interacting with the data system. For example, a user can interact with the data system to define a flow (e.g., providing identifying information, input type, schema, setting primary keys, describing data transformations, etc.), which can be saved in Flow Storage 1220. A user can also interact with flow storage 1220 to read a flow, update the definition of a flow, or delete a flow.

Metadata Storage 1230 can be configured to store metadata. In some embodiments, metadata can be stored as objects. For example, metadata can be stored as JSON, YAML, or similar objects. In various embodiments, metadata storage 1230 can be implemented using metadata repository service (e.g., using AWS Glue to store table definitions and schema in an AWS Glue Data Catalog). In some embodiments, metadata storage 1230 can include a schema service configured to provide a schema associated with input data 1260 or with the flow. For example, in response to a request to display certain data stored in a data lake, the flow service can obtain a schema for that data from the schema service. As an additional example, the schema may be associated with the flow and may be obtained by flow service 1210 in response to obtaining the flow. In various embodiments, metadata storage 1230 can be configured to store technical metadata, business metadata, usage metadata, or quality metadata for input data 1260. For example, the technical metadata may indicate a physical or logical location of input data 1260, or a lineage of input data 1260. Business metadata may indicate a product or business metric associated with input data 1260. Usage metadata can indicate restrictions on accessing the input data (e.g., indicating that the input data concerns personally identifiable information, financial information, or the like). Quality metadata can indicate the quality of input data 1260, including such characteristics as the number of missing values or the like.

Artifact Storage 1240 can be configured to store artifacts. Artifacts can be data or instructions usable by the flow service to perform operations on the input data during flow execution. Artifacts may include scripts (e.g., SQL scripts or statement, Python scripts, or the like), executable binaries, or modules (e.g., Java modules, or the like). The flow service can be configured to integrate the artifact into the data processing pipeline. Artifacts may be associated with a client of the data system. For example, an artifact may include data and instructions providing proprietary functionality, such as machine-learning prediction or classification functionality. In some embodiments, flow service 1210 can be configured to determine whether an artifact is authenticated for use with a flow. Such authentication can be performed based on at least one of metadata associated with the flow or metadata associated with the artifact.

Operations Storage 1250 can be configured to store operation objects. Similar to artifacts, operation objects can be data or instructions usable by the flow service to perform operations on the input data during flow execution. Operation objects may include scripts (e.g., SQL scripts or statement, Python scripts, or the like), executable binaries, or modules (e.g., Java modules, or the like). The flow service can be configured to integrate the operation objects into the data processing pipeline. Unlike artifacts, operation objects may be available for use by any client of the data system.

Input data 1260 can be data stored in at least one database. In some instances, the at least one database can be or include an append-only immutable log, such as a Kappa storage. In various embodiments, the at least one data can be or include a data lake, such as an S3 bucket or a Delta Lake. Input data 1260 may be accessible at a logical or physical location in the at least one database. For example, a flow can specify an input data object stored in the data lake (e.g., as a network address for an HTTP "get" request, or the like). As an additional example, the data system can be configured to obtain input data from a predetermined location, such as an Kinesis Firehose endpoint or a default S3 bucket.

Pipeline 1270 can be infrastructure created to process input data 1260 into output data 1280 as specified in the flow retrieved from flow storage 1220. As described above with regards to flow service 1210, flow service 1210 can be configured to generate instructions for creating pipeline 1270 using the flow and any metadata, artifacts, or operations specified by the flow. Such instructions can by consumed by a cloud computing platform implementing the data system (e.g., Amazon AWS, Microsoft AZURE, IBM Cloud, or the like). In response to the instructions generated by flow service 1210, the cloud computing system can create or configure components including data sources, data storage components, data processing and analysis components, schema management components, metadata generation or tagging components, or the like.

As a non-limiting example, flow service 1210 can convert a flow into a declaration specifying that data stored in an append only data source (e.g., appended from a Kinesis Firehose Delivery Stream) be converted into a discretized stream using and processed using an automated cluster management program (e.g., Databricks components such as Spark Streaming, Spark launcher, Databricks Spark) or the like. The declaration can specify certain data transformations, such as adding columns to a table, removing bad records, updating or recoding values, or the like. The automated cluster management program outputs can be stored in a data lake (e.g., Delta Lake, or the like). In some embodiments, the declaration can specify a schema for the data (as stored in the append-only data source or as output from the automated cluster management program). In various embodiments, a schema service (e.g., provided by Delta Lake, or the like) can be configured to automatically detect a schema of the data stored in the data lake, evolving and tracking the schema as necessary. The declaration can be converted into instructions configuring the components of the pipeline 1270 (e.g., the location of the input data in the append-only datasource, the storage location in the data lake, the configuration and jobs performed by the Databricks components, etc.). Pipeline 1270 can then be executed (e.g., immediately, according to a schedule, or in response to an event or user request). After being executed, pipeline 1270 can be torn down, freeing compute and storage resources for other jobs.

As an additional non-limiting example, a flow can be converted into a declaration specifying that certain data stored in the data lake be processed (e.g., using workflows defined in Airflow or Amazon Redshift) and stored in a data warehouse (e.g., using Snowflake or Amazon Redshift). The declaration can further specify that the data stored in the data warehouse be provided to a user in response to a query (e.g., using Presto or Spectrum) for consumption in Tableau or the like. The declaration can be converted into instructions configuring the components of pipeline 1270, pipeline 1270 can be executed, and then pipeline 1270 can be torn down, freeing the compute and storage resources for other jobs.

Output data 1280 can include data objects or descriptions of where to find data objects. For example, output data 1280 can include data objects generated by pipeline 1270. As an additional example, output data 1280 can include a path or other indication of where to find the output of pipeline 1270.

In some instances (e.g., when a flow is executed to provide data stored in a data lake to a user), the output data can be further processed using serving layer 1290. As depicted in FIG. 12, serving layer 1290 can be independent of pipeline 1270. However, this depiction is not intended to be limiting. In some embodiments, serving layer 1290 can be configured (e.g., by flow service 1210) to act as a component of pipeline 1270. In some instances, the flow may have been executed in response to an API call received from a user device. The serving layer can include logic that translates output data 1280 back to the context of the calling user device. For example, the user device may have executed a JDBC API query including SQL statements concerning fixed-size string (e.g., char (n) data) or smallint-typed data. The data system may be configured to store differently typed, semantically equivalent data (e.g., a null-terminated array of characters rather than a fixed-size string, or a double precision float rather than an integer). As a further example, the user system may expect the result of the query to be an SQL query result, while the data may be stored in a Databricks Delta Lake format. The server layer can be configured to translate the types into the expected types (e.g., from null-terminated strings into fixed-size strings) and package the result in the expected format (e.g., as a tabular data structure or SQL query result). Other possible contexts include an Open API call, an Odata call, a SOAP web service invocation, or an XML-RPC call.

Figure 13:
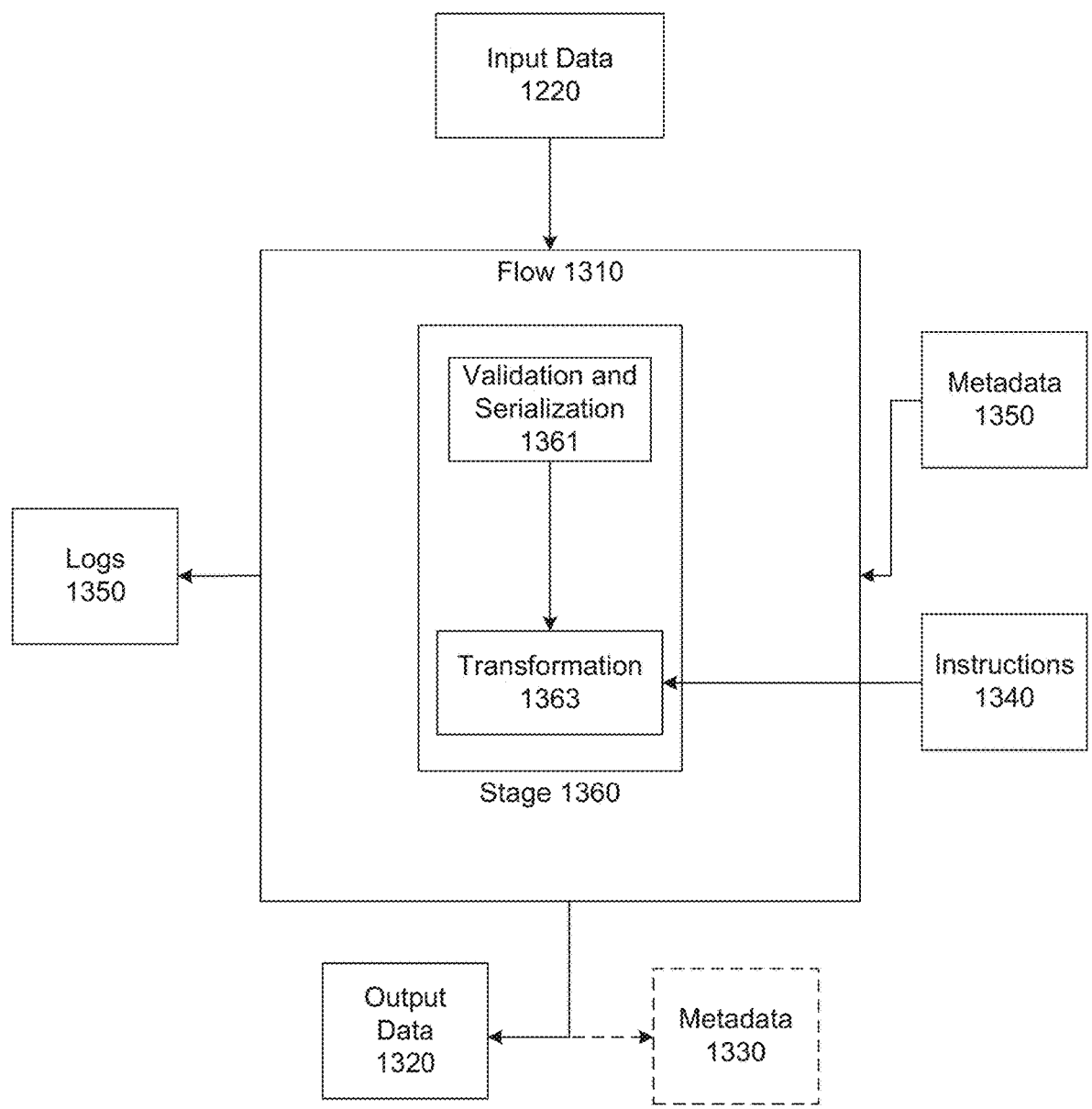
FIG. 13 depicts a logical structure of a flow, consistent with embodiments of the present disclosure.

FIG. 13 includes a logical depiction of a flow 1310. As described above with regards to FIG. 12, flow 1310 can be a JSON, YAML, or similar object. The following exemplary JSON flow is consistent with disclosed embodiments.

```
{
  "flowID" : "a1eb811e-2b41-4ad8-a8e2-63a05163a1af",
  "flowName" : "flowName two",
  "sortKey" : null,
  "flowGroupId" : "635140d0-56a8-4d60-8c7e-5f1407c3d614",
  "flowGroupName" : "FG",
  "badObjectName":"myBadObjectName",
  "badEnabled" : [ "JDBC", "ODATA" ],
  "orgCodePattern" : "lit(""myOrg"")",
  "owner" : "myOwner",
  "stages" : [ {
    "level" : 0,
    "input" : {
      "type" : "FILE",
      "schema" : "fixed-length-fl",
      "options" : {
        "parsingOptions" : [ {
          "columnName" : "id",
          "start" : 1,
          "end" : 2
        }, {
          "columnName" : "name",
          "start" : 5,
          "end" : 15
        }, {
          "columnName" : "class",
          "start" : 20,
          "end" : 31
        } ],
        "fileType" : "fl"
      }
    },
    "transformation" : {
      "columns" : [ {
        "name" : "columnNew",
        "value" : "'dummyVal'"
      } ],
      "columnsFromFileName" : [ {
        "name" : "myColumn",
        "value" : "([0-9A-Za-z]{3})"
      } ]
    },
    "metrics" : {
      "metrics" : [ {
        "metric" : "max(\"age \")"
      }, {
        "metric" : "size( )"
      } ]
      MetricTable : "table name"
    },
    "action":{
      "actions":[
        {
          "actionName":"Stream Forward",
          "actionType":"STREAM FORWARD",
          "actionParameters":"{\". . .\":\". . .\"}"
        }
      ]
    },
    "output" : {
```

```
    "primaryKey" : null,
    "partition" : [ "owner", "year", "date", "hour" ],
    "enabled" : [ "JDBC", "ODATA" ],
    "objectName" : "sampleTable10"
    }
} ],
"createdTime" : "2019-09-24 14:07:11",
"updatedTime" : "2019-09-24 14:11:05",
"removedTime" : null,
"version" : 3
"allowIncrementalViews": false,
"createTextFile": false
}
```

As would be appreciated by those of skill in the art, this flow is exemplary and not intended to be limiting. The following attributes are included in this flow:

flowGroupID (string)—System-assigned unique identifier of the flow group containing this flow. In some embodiments, flow storage 1220 can store flow groups, which can be JSON or YAML objects. Flow groups can be used to organize related flows (e.g., flows concerning the same product, or flows concerning related functionality, or the like).

flowName (string)—User-friendly display name assigned by the consumer.

flowID (string)—System-assigned unique identifier of the flow.

flowGroupName (string)—User-friendly display name for the flow group assigned by the consumer.

badObjectName (string)—Table name for bad records. The pipeline can be configured to store bad records in a database for subsequent review (and potential correction). The database can be a document-oriented database, such as MongoDB, DynamoDB, or the like.

badEnabled (List)—Like "enabled", for bad records table.

sortKey (string)—access pattern. In some embodiments, flow storage 1220 can use a composite key, with flowID serving as a partition key and access pattern serving as a sort key. Each flow would be uniquely identified by the combination of FlowID and access pattern. Example composite keys include:

flowid|flow#owner#<owner> flowid|flow#flowGroupName#<owner>#<flowGroupName> flowid|flow#V0#metadata#<owner>#<flowGroupName>#<flowName> flowId|flow#<versionNumber>#stage#0.

flowId|flow#<versionNumber>#<inputType> flowId|flow#<versionNumber>#<objectname>

In each of the above examples, attributes in "< >" are replaced by the corresponding attribute values, while text not surrounded by "< >" is constant. For example, when the access pattern is "flowId|flow#<versionNumber>#stage#0" and the flow is version 2, then the sort key will have the value "flow#V2#stage#0". When the access pattern is "flowId|flow#<versionNumber>#<inputType>" and the flow is version 0 and accepts file input, then the sort key will have the value "flow#V0#FILE".

orgCodePattern (string)—a lit ("literal") or col ("column") pattern specifying how to retrieve the organization code for single or multi-tenant tables. As described above with regards to FIG. 10, data objects can be stored in tenancies. In some embodiments this attribute can be used to identify the appropriate tenancy for ingested data. When the value is a literal, all of the data processed by the flow can be stored in the same tenancy. When the value is a column identifier, then the value of the column for each row can indicate the appropriate tenancy for that row.

owner/dataSteward (string)—identifier for user or super-user responsible for managing the stored data. This attribute can be used to set access privileges for the data.

Stages (List)—Data submitted to the flow will process through each of these stages. In some embodiments, a stage with level 0 must always be defined. In the above example, only stage zero has been defined.

level (integer)—Order in which the stage is applied to data flowing through the system (0-based).

input (object)—Details of the data arriving into the data system.

type (enum: File, Stream, API)—Transport mode in which the data is arriving into the data system (e.g., FILE, STREAM, API)

options (map)—A list of options that apply to the system's understanding of the input data, and the meaning of these options will vary based on the input type. For example, when configuring an input with type 'FILE, these options will relate to the system's ability to parse the file (e.g., specifying keys such as 'delimiter', 'header', etc).

schema (string)—The name of the schema that defines the data being submitted to the flow. In some embodiments, the schema service must have the schema prior to executing the flow. In such embodiments, this attribute can be used to obtain the schema from the schema service (e.g., "fixed-length-fl" in this example can be obtained from metadata storage 1230).

Transformation (object)—Optional section that defines how data will be transformed or enriched as it is written into the output destination (e.g. the data lake).

columns (List)—List of columns that will be added or updated to an output table in output data 1280, using the expression configured.

name (string)—The name of the column applying to the transformation. If this column already exists, then the values in the column are updated. Otherwise, in some instances, a new column can be added at the end (right side) of the output table in output data 1280.

value (string)—Expression to use when transforming the column value. All supported SQL functionality can be used here, and existing columns defined via the schema obtained from the schema service can be referenced.

columnsFromFileName (List)—List of columns that will be added or updated on the resulting output table, whose value will be extracted from the uploaded file's name. If the user requires the date pattern from file name and preserve it for further processing, the same can be achieved by giving the values accordingly in ColumnsFromFileName.

name (string)—The name of the column applying to the transformation. If this column already exists, then it's value is updated; otherwise, a new column can be added at the end (right side) of the output table.

value (string)—Expression to use when transforming the column value. The uploaded file's name can be used as the input string, and any standard regular expressions can be applied to extract the desired value.

output (object)—Controls the way in which data will be organized within the output destination (e.g. the data lake) and made accessible to the consumer.

primaryKey (List)—List of columns that makes a record unique. This can be used to support single record retrieval and to differentiate between an update vs an insert. This can also ensure that data is not duplicated. If there is no primary key, it will not merge and could duplicate the data.

partition (List)—List of column names that can be used to partition the output destination (e.g. a table in the data lake). In some embodiments, the listed column names may be or include those storing values used as keys and/or filters typically used to retrieve records. For example, the entity key would be appropriate for dimensional records (such as a customer or institution) that are retrieved individually, and some form of date value is typically used for records that are retrieved in a larger batch (ex: get all activity logs for '2019 Aug. 23').

objectName (string)—Name that will be assigned to the output data. In some embodiments, this name may be used when retrieving the information (e.g., querying the information over JDBC, oData, OpenAPI, SQL, GraphQL etc). In some embodiments, this name would be unique across all configured flows.

enabled (List)—Defines the ways in which information processed through the flow stage will be made available to the consumer. These options relate to the functionality offered by the data system and relate to the security controls within the system. As described herein, output data may be stored in a data storage (e.g., a data lake). How that data may be retrieved (e.g., through JDBC or oData as shown in the above example, OpenAPI, SOAP, XML, or the like), or how much of the data is accessible to users in different roles (or otherwise having different authorizations) can be set using this attribute.

constraints (object)—Optional section that defines data quality constraint to be processed in stages 1-X only. This section is not depicted in the above example.

Rules (list)—The list of configured constraint rules that will be applied for the stage.

Rule (String)—The constraint that will be processed. Contains the name of the constraint, the column in which the constraint will be run against, and any other arguments required with the constraint.

ColumnRequired (boolean)—true or false value. Optional field that when configured as true, the configured column in the "Rule" field must be configured as required in the schema definition.

Default (object)—optional field, that when set will be used in constraint logic to replace any column values if they fail the constraint.

action (object)—Optional section that defines the actions, in stage 0 only.

actions (list)—list of metrics to be run.

actionName (string)—human readable name for action.

actionType (ActionType)—type of action. This is an enum in the code. actionParameters (string)—JSON string containing all arguments needed to run this action Metrics (object)—Optional section that defines the data quality metrics to be processed in in stage 0 only.

Metrics (list)—list of metrics to be run.

Metric (string)—the metrics that will be processed. Contains the name of the metric, a column if required for the metric, and any optional arguments.

MetricTable (string)—An optional user defined name for the metric table where all metrics for the data will be stored. Will default to "metric table" if not configured.

createdTimestamp (long)—UTC epoch timestamp that tracks the date/time the flow was created.

updatedTimestamp (long)—UTC epoch timestamp that tracks the date/time the flow was last modified. In some embodiments, each "update" to a flow definition can be tracked as a new version of the flow.

removedTimestamp (long)—UTC epoch timestamp that tracks the date/time the flow was deleted (aka a new version was created in a separate record). The record with a value of 0 indicates the current active version.

version (integer)—Incremental counter (1-based) that tracks the version of the flow. In some embodiments, each time a flow is updated, a new version is created as a separate record.

allowIncrementalView (boolean)—Allow incremental views creation for and anonymization process.

create TextFile (boolean)—Allow.txt file creation into an AWS S3 bucket for the anonymization process.

As would be appreciated by those of skill in the art, the above attribute list and example is not intended to be limiting. Implementations may include some of these attributes, additional attributes not listed above, or modifications or combination of attributes listed above without departing from the scope of the disclosed embodiments.

As shown in the above exemplary flow definition, a flow can include stages, such as stage 1360 depicted in FIG. 13. A stage can specify a source (e.g., the append-only data store, an external federated database, or the like), a data transformation (e.g., adding columns, coding or otherwise modifying values, filtering rows, or the like), and a destination (e.g., a data lake or a view provided to a user). In some embodiments, as stage can specify that input data be validated, transformed, and serialized. Such specification can be express in the flow definition, or at least partially implicit. For example, the data system may be configured to automatically perform validation and serialization of the flow. In such instances, the flow specification may extend or further specify the validation or serialization automatically performed; or cancel at least some of the validation or serialization automatically performed.

In some embodiments, validation and serialization 1361 can include determining whether the input data can be read (e.g., whether the input data is encrypted), whether the data can be secured (e.g., can a tenancy be identified for the data), whether the data can be processed (e.g., whether the values are appropriate for the types defined for the data, such as whether values identified as timestamps have legitimate values for timestamps). In some embodiments, as described above with regards to flow attributes, additional constraints on data validity can be specified. Records or files failing validation or serialization can be written to a "bad records" data store In some embodiments, transformation 1363 can be performed by the pipeline (which may be executed by, for example, the data analytics system on, for example, a cloud computing platform, or the like) as specified by flow 1310. For example, transformation 1363 can include enhancing the input data with additional columns, deduplicating records based on specified key values, casting values into types used by the destination data storage (e.g., the data storage may use C-style data types while the input data may use SQL-style datatypes), or applying functions (e.g., machine-learning classification or prediction algorithms) to generate values for inclusion in the output data.

In some embodiments, flow 1310 can specify that transformation 1363 is performed using instructions 1340, which may be external to flow 1310. For example, such instructions can include artifacts obtained from an artifact repository, or operation objects obtained from an artifact repository. The artifacts or operation objects may be subject to authentication or authorization requirements. The data system may be configured to authenticate or authorize instructions 1340 prior to integrating these instructions into execution of flow 1310.

In various embodiments, flow 1310 can specify that input data 1220 is to be processed using metadata 1350. For example, flow 1310 can describe a schema for use in processing the input data. As an additional example, metadata 1350 can describe rules for associating semantics with input data 1220 (e.g., identifying, tagging, or classifying input data 1220). Such associating can include identifying and tagging fields or records as containing personally identifiable information (e.g., as a birthdate, social security number, etc.) or as having a specific business purpose (e.g., as contributing toward direct costs or SG&A, as relating to customer retention, as concerning a regulatory or contractual obligation, or the like). In some embodiments, the data system, using the flow 1310 and metadata 1350, can construct the pipeline to appropriate process the input data.

Output data 1320 can be generated by the pipeline implementing flow 1310. Output data 1320 can be data objects or references to data objects stored in the data system. The data system can be configured to store output data 1320 in a data storage (e.g., a data lake) or provide output data 1320 in a view to a user device.

In some embodiments, the pipeline may generate output metadata 1330. Output metadata 1330 can arise from the application of rules specified in flow 1310, metadata 1350, or instructions 1340, to input data 1220. For example, as described above, the metadata may include rules for detecting personally identifiable information in input data 1220. In some embodiments, upon detection of such information, a schema for the input data may be updated to indicate that a record or column contains the detected personally identifiable information. The data system may be configured to store metadata 1330 in a metadata storage, or to update metadata in the metadata storage based on metadata 1330.

The data system can be configured to generate logs 1350 while executing the flow. In some embodiments, logs 1350 can enable tracing of the lineage of data stored in the data system. Such lineage data can be written to a metadata repository and subsequently used to track or govern access to the data. Logs 1350 can also contain the state of the pipeline. For example, the pipeline may be configured to process input data 1220 in parts (e.g., record by record, in batches of multiple records, by document or object, or the like). In some embodiments, logs 1350 can be updated as such parts are processed, or upon completion of the pipeline. As an additional example, the pipeline may be configured to perform multiple data processing operations on input data 1220. In various embodiments, logs 1350 can be updated as data processing operations are completed. In this manner, should the pipeline terminate unexpectedly, a new pipeline can be created with an appropriate state. For example, the new pipeline can be configured to process data that had not already been processed by the terminated pipeline and perform data processing operations that had not already been performed by the terminated pipeline.

Figure 14:
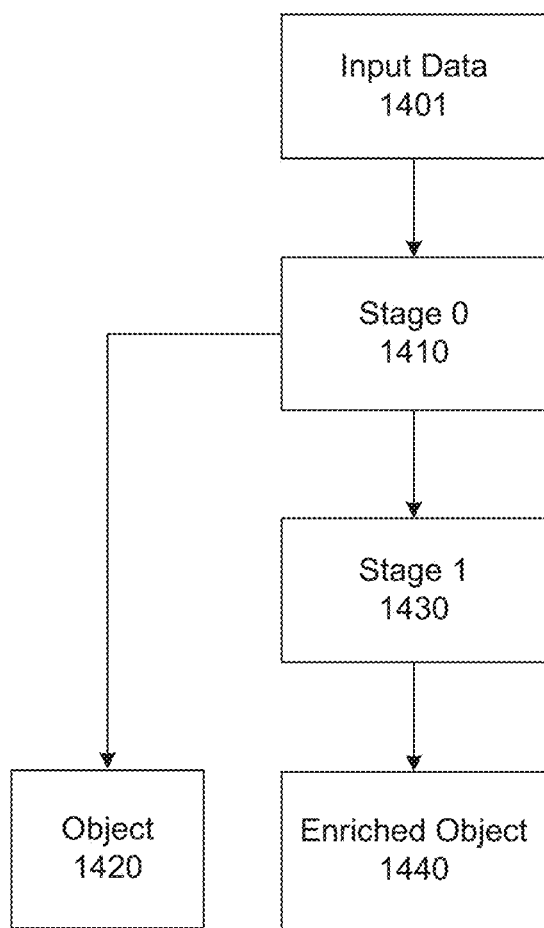
FIG. 14 depicts an exemplary flowchart illustrating execution of a flow that specifies two-stage processing of input data, consistent with embodiments of the present disclosure.

FIG. 14 depicts an exemplary flowchart depicting execution of a flow 1400 that specifies two-stage processing of input data. In this non-limiting example, flow is 1400 defined by the following JSON object:

```
{
  "flowName": "people",
  "flowGroupName": "demo",
  "orgCodePattern": "lit(\"dsg\")",
  "dataSteward": "dsg",
  "stages": [
    {
      "level: 0,
      "input": {
        "type": "STREAM"
      },
      "output": {
        "primaryKey": ["personId"],
        "objectName": "person",
        "enabled": ["GRAPHQL", "ODATA"]
      }
    },
    {
      "level": 1,
      "transformation": {
        "columns": [
          {
            "name": "FISCustomerId",
            "value": "lookupFISCustomerId(personId)"
          }
        ]
      }
      "output": {
        "primaryKey": ["personId"],
        "objectName": "personEnriched",
        "enabled": ["GRAPHQL", "ODATA"]
      }
    }
  ]
}
```

In this non-limiting example, the input data comprises JSON data published to a real-time streaming endpoint provided by the data system using a CLM (common logging mechanism) pattern. The published data has the following format:

{"personId":1, "firstName":"Jane", "lastName": "Doe"}

Flow 1400 has the flowname "people" and is part of the flowgroup "demo". Flow 1400 is associated with the tenancy dsg (specified in the flow using a literal value—meaning that the input data is not multi-tenancy). The data steward associated with the processed data is "dsg" —users of the data system associated with this data steward will be responsible for maintaining this data in the data system.

In stage 1410 ("stage 0"), flow 1400 identifies the data as streaming data. Stage 1410 specifies that the name of the object 1420 is "person" and defines a primary key for this output data (e.g., "personID"). As described above, the pipeline implementing this stage may perform some general data validation (e.g., checking types, identifying bad records, deduplicating records by primary key value, or the like). The stage may indicate the acceptable methods by which object 1420 can be accessed (e.g., in this nonlimiting example through API calls using GraphQL or Open API). These restrictions on accessibility can be enforced using metadata generated during execution of the pipeline (e.g., metadata 1330 or the like).

During flow execution, as the pipeline processes the streaming data records, the output data is stored in a destination storage location (implicitly specified in this non-limiting example). In this non-limiting example, the components of the pipeline can detect any table schema relating to the input data and apply this schema when processing the data (alternatively or additionally, as described herein, a schema can be explicitly associated with flow 1400 and used to process the input data). In some embodiments, the detected schema or changes in the detected schema can be propagated to a metadata repository. When a user queries the data, the schema or updated schema can be associated with the data and used to service the user query. As an example of such a schema:

person (ADE managed table schema)
    personId: integer
    firstName: string
    lastName: string In some embodiments, as the streamed input data 1410 changes over time (for example, a new attribute is added to the JSON being published), the pipeline (or another instance of the pipeline arising from a subsequent execution of flow 1400) can seamlessly ingest the altered data and automatically evolve the associated schema. For example, when input data 1410 includes:

{"personId":2, "firstName":"John", "lastName":"Doe", "type": "customer"} then the schema can become:

person (ADE managed table schema)
    personId: integer
    firstName: string
    lastName: string
    type: string To continue this example, the query:
select * from person
would return the following result:

| personId | firstName | lastName | type |
|---|---|---|---|
| 1 | Jane | Doe | null |
| 2 | John | Doe | customer |

As can be observed from FIG. 14, object 1420 can be stored in the destination storage even though stage 1430 ("stage 1") performs further processing on the output of stage 1410. In this nonlimiting example, stage 1430 specifies an additional data transformation that enriches the person raw data set, utilizing a function called lookupFISCustomerId to append a new column called FISCustomerId. As described herein, the function lookupFISCustomerId may an operation object obtained from an operation storage. In some embodiments, the data system may provide standard enrichment functions that are available to all users, as well as tenant-specific functions that are managed by and restricted to the users of a specific organization. These enrichment functions can utilize other input data as a source (both "local" to the data system and "virtual" external databases), and can also make use of user-defined artifacts (e.g., via custom JARs provided by the user and obtained from an artifact storage).

To continue the prior example, the pipeline has ingested the two records below.
    {"personId":1, "firstName":"Jane", "lastName":"Doe"}
    {"personId":2, "firstName":"John", "lastName":"Doe"}

Given a query to the entity name for enriched object 1440, defined by the stage 1 output (e.g., personEnriched):
select * from personEnriched the data system will provide enriched object 1440. In this example, the schema used to provide the enriched object 1440 will be the schema automatically detected for this data. As described herein, this schema may be associated with enriched object 1440 but stored separating in a metadata repository.

| personId | firstName | lastName | FISCustomerId |
|---|---|---|---|
| 1 | Jane | Doe | 882KKLSDWEF3 |
| 2 | John | Doe | 992KLKJSDFH3J |

In some embodiments, even though a flow might specify multiple stages, flow service 1210 can be configured to implement the flow in a single stage. For example, flow service 1210 may determine that multiple transformations specified in multiple stages can be combined into a single operation. Flow service 1210 may then create a pipeline that performs these transformations in a single stage.

Figure 15:
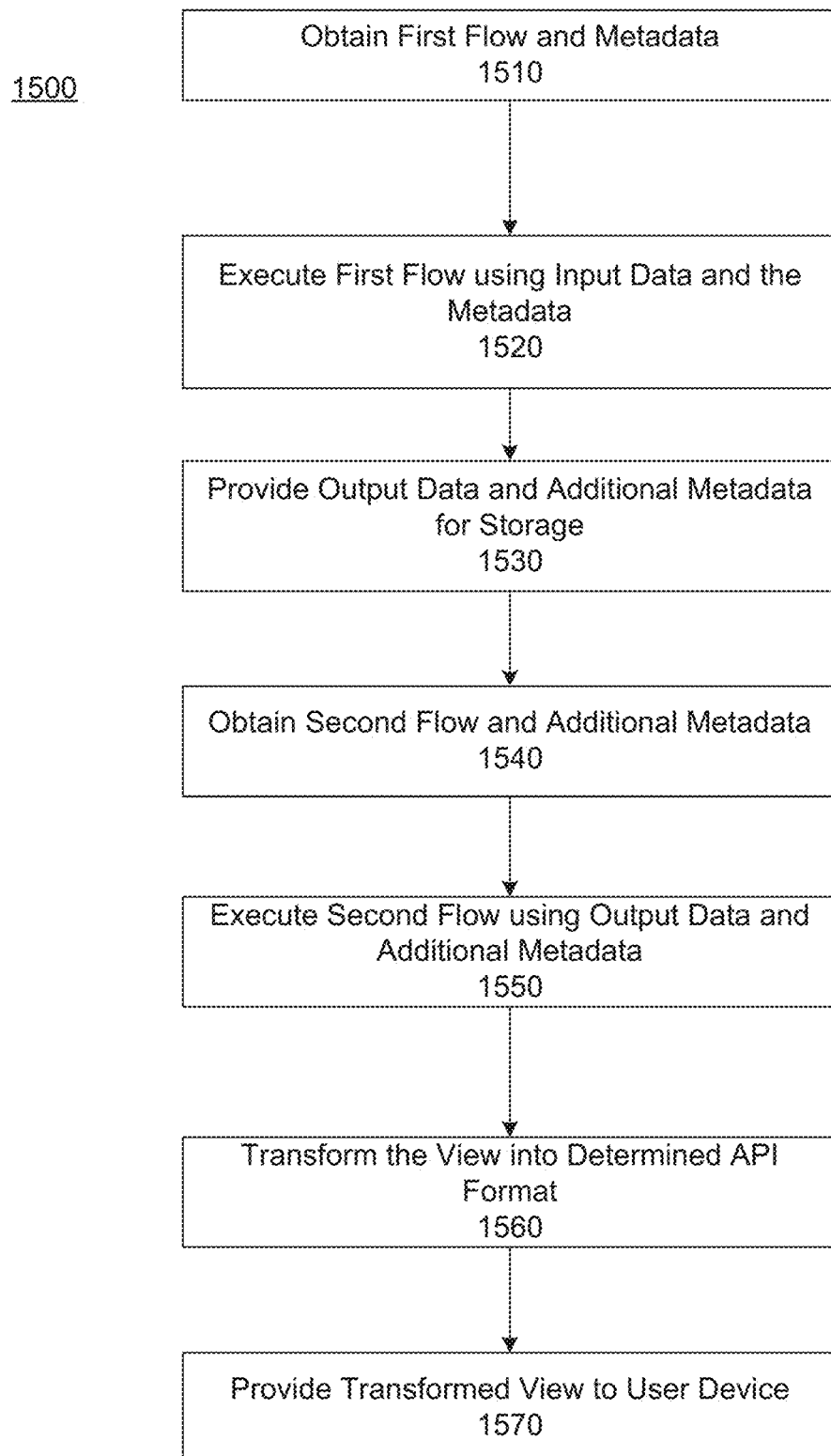
FIG. 15 depicts a flowchart illustrating a process implemented by the data analytics system, consistent with embodiments of the present disclosure.

FIG. 15 depicts a flowchart of an exemplary method 1500 of processing data using a flow service (e.g., flow service 1210, or the like). Method 1500 can be performed using components described herein, such as a flow storage (e.g., flow storage 1220, or the like), metadata storage (e.g., metadata storage 1230, or the like), object storage (e.g., artifact storage 1240, or the like), operations storage (e.g., operations storage 1250, or the like), serving layer (e.g., serving layer 1290) or the like.

As described herein, the data system can create a flow service, flow storage and metadata storage. In some embodiments, the data system can further create an object storage, operations storage, or serving layer. The data system can be configured to create these components using, at least in part, an infrastructure-as-code approach, in which one or more declarative specifications describing the components is consumed by an infrastructure-as-code application (e.g., Terraform, AWS CloudFormation, or the like), to deploy the components on a cloud services platform.

In step 1510 of method 1500, the data system can configure the flow service to obtain a flow and metadata associated with the flow. The flow can be configured in response to instructions received from a user, in accordance with a schedule, or in response to an event (e.g., a sufficient amount of data being landing at a location in the data system). For example, the data system can receive first instructions. The second instructions can comprise an API call from a user device. The instructions can specify the execution of the flow. The flow service can be stateless. In some embodiments, the actions taken by the flow service can depend on the flow and other inputs to the configuration of the flow service. The flow service can obtain the flow from the flow repository. The flow can be an object, such as a JSON or YAML object. The flow can specify one or more stages to be implemented by the pipeline. Such stages can be logically arranged in a sequence, with the output of one stage forming the input of the next stage. One or more of the stages can specify a data transformation. The flow can specify permissible methods of accessing the data produced by the pipeline. For example, the flow can specify that the output data can be accessed using at least one of GraphQL, SOAP, Odata, OpenAPI, or XML-RPC. The metadata can be obtained from the metadata store. In some embodiments, the metadata can specify a schema for input data processed using the flow, or rules for associating semantics with input data 1220 (e.g., identifying, tagging, or classifying input data 1220).

In step 1520 of method 1500, the data system (e.g., the flow service, or the like) can execute the flow. In some embodiments, the flow service can be configured to execute the flow according to a schedule or in response to an event, such as receipt of instructions or storage of the input data into the at least one data store. Executing the flow can include constructing components to perform the processing specified in the flow in accordance with the obtained metadata. For example, the flow can be converted into instructions. The instructions can be consumed by an application (e.g., Terraform, AWS CloudFormation, or the like) to provision the cloud platform with components for performing the processing specified in the flow. The pipeline, when created, can obtain input data from the at least one data storage. The pipeline can then generate output data at least in part by validating, transforming, and serializing the input data, as described herein. The pipeline can generate the output data using the metadata (e.g., using a schema or rules for associating semantics with the input data or output). In some instances, the pipeline can generate additional metadata describing the output data. Such additional metadata can at least one of result from application of rules to the input data or output data; concern a lineage of the output data; include a schema or an update to a schema of the output data; or describe a physical or logical storage location of the output data. For example, the additional metadata can specify a schema of the output data.

In various embodiments, the flow service is further configurable by the flow or metadata to obtain an artifact implementing data transformation from the artifact storage. For example, the flow may specify that the pipeline perform this data transformation. Executing the flow can then include performing the data transformation. In such embodiments, generating output data includes executing the artifact to perform the first data transformation. The artifact can include a script (e.g., Javascript, SQL script, Python script, or the like), executable binary (e.g., machine learning inference or classification function, or the like), or module (e.g., a Java module or package, or the like).

In some embodiments, the obtained metadata can include access metadata. For example, the access metadata can describe whether a user can access the input data or use a particular method (e.g., a particular API call, or the like) to access the input data. The flow services can be configurable to determine, using the access metadata, an authorization to access the input data or an authorization to execute an object implementing a transformation of the input data, the transformation specified in the flow. For example, during the configuration of the flow service, the flow service can determine whether the input data can be accessed (or the object executed) using the access metadata. Additionally or alternatively, the pipeline can be configured to determine whether the input data can be accessed (or the object executed) using the access metadata. The input data maybe accessed (or the object executed) only if authorized. Otherwise the flow service configuration or pipeline execution may terminate.

In various embodiments, the metadata can include technical metadata. The technical metadata can specify at least one of a physical or logical location of the input data. The flow service can be configured to access the input data using the specified physical or logical location (e.g., an S3 bucket, delta lake, or the like). For example, the flow service can be configured to generate a pipeline that accesses the input data at the specified physical or logical location.

In step 1520 of method 1500, the data system can provide the output data for storage in the at least one data store. The data system can also provide the additional metadata for storage in the metadata repository. In some instances, the at least one data store comprises an append-only data store (e.g., kappa storage, or the like) in addition to a data lake (e.g., a delta table, snowflake database, S3 bucket, or the like). In such instances, the input data can be retrieved from the append-only data store and the output data can be written to the data lake. In various instances, the input data and be obtained from the data lake, or from an external database accessible through a federation layer, and the output layer can be written back to the data lake. In some embodiments, upon completion of the data processing specified in the flow, the flow service can tear down the pipeline (e.g., by providing instructions to the cloud computing platform to teardown at least some of the components used in the pipeline).

In step 1540 of method 1500, the flow service can be further configured using received second instructions. For example, as some point following execution of the first flow, the data system can receive second instructions. The second instructions can comprise an API call from a user device (e.g., a JDBC query, oData API call, OpenAPI call, SOAP web service invocation, or the like). In response to the second instructions, the flow service can obtain a second flow from the flow storage and the additional metadata from the metadata storage.

In step 1550 of method 1500, the flow service can execute the second flow (e.g., create, execute, and teardown the pipeline). Executing the pipeline can include obtaining the output data from the data store using the additional metadata and generating a view of at least some of the output data using the additional metadata. Generating the view can also include performing data processing operations on the obtained output data. The view can be provided for display on a user device (which may or may not be the same user device that provided the second instructions).

In some embodiments, the flow service can be configured to determine an authorization to generate the view using the additional metadata and an identity associated with the user device. The identity can indicate a role or other characteristic of a user logged onto the user device or making the API call. The identity can be a key or other credential. The identity can concern the user device (e.g., a network address or MAC address of the user device, or the like). As described herein, the flow service can determine the authorization during configuration of the flow service or during execution of the flow service. The view may only be provided if the generation of the view is authorized. Otherwise the flow service configuration or pipeline execution may terminate.

In step 1560 of method 1500, the serving layer may receive the view. The server layer may determine a delivery API characteristic of the user device, as described herein. In some embodiments, this determination may depend on logging or tracking the API request that initiated execution of the flow, may be specified in the additional metadata, or may be specified by the flow. The serving layer can be configured to transform the view into a delivery API format based on the characteristics of the user device (e.g., changing a format or the data, the organization of the data, the packaging of the response, or the like).

In step 1570 of method 1500, the data system (e.g., the serving layer or another layer) can provide the transformed view to the user device.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. Furthermore, non-transitory computer-readable media can contain instructions, that when executed by one or more processor, cause a computing system (e.g., a cloud computing platform, computing cluster, or the like) to implement the disclosed systems and methods. In addition, while certain components have been described as being coupled to one another, such components may be integrated with one another or distributed in any suitable fashion.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive.

Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A data analytics system, comprising:
    at least one computer-readable medium containing instructions; and
    at least one processor which executes the instructions to perform operations comprising:
        creating a pipeline, in response to received instructions, configured to:
            extract identifying characteristics from data in a first append-only data store;
            provide the identifying characteristics to an identity service;
            receive a tenancy identifier from the identity service;
            create a tenancy object in a second data store using the extracted identifying characteristics;
            write the created tenancy object to an internal data store;
            associate the tenancy object with a parent object; and
            upon associating the tenancy object with the parent object, tearing down the pipeline.

2. The system of claim 1, wherein the pipeline is configured with at least one location of the data.

3. The system of claim 2, wherein the extracted identifying characteristics includes values stored at the at least one location.

4. The system of claim 1, wherein associating the tenancy object with the parent object comprises associating the tenancy object with the parent object in a hierarchical data object ownership graph.

5. The system of claim 1, wherein creating the tenancy object is based on the identifying characteristics of the extracted data.

6. The system of claim 1, wherein the identity service stores a plurality of tenancy identifiers.

7. The system of claim 1, wherein the operations further comprise:
    formatting information to convert the data from one format to a second format.

8. The system of claim 1, wherein:
    the tenancy object and parent object are associated based on a dependence of the locations of the parent object or the tenancy identifier.

9. The system of claim 1 wherein the pipeline is further configured to:
    allow a user permitted to access a parent object to access all data objects associated with the parent object.

10. The system of claim 1 wherein:
    the operations further comprise disassociating the tenancy object from the first parent object and associating the tenancy object with a second parent object.

11. A data storage method, comprising:
    creating a first pipeline, in response to received instructions from a data analytics system, configured to:
        extract identifying characteristics from data in a first append-only data store;
        provide the identifying characteristics to an identity service;
        receive a tenancy identifier from the identity service;
        create a tenancy object in a second data store using the extracted identifying characteristics;
        write the created tenancy object to an internal data store;
        associate the tenancy object with a parent object; and
        upon associating the tenancy object with the parent object, tearing down the pipeline.

12. The data storage method of claim 11, wherein the pipeline is configured with at least one location of the data.

13. The data storage method of claim 12, wherein the identifying characteristics includes values stored at the at least one location.

14. The data storage method of claim 11, wherein associating the tenancy object with the parent object comprises associating the tenancy object with the parent object in a hierarchical data object ownership graph.

15. The data storage method of claim 11, wherein creating the tenancy object is based on the identifying characteristics of the extracted data.

16. The data storage method of claim 11, wherein the identity service stores a plurality of tenancy identifiers.

17. The data storage method of claim 11, wherein the operations further comprise:
    formatting information to convert the data from one format to a second format.

18. The data storage method of claim 11, wherein:
the tenancy object and data object are associated based a dependence of the locations of the data object or the tenancy identifier.

19. The data storage method of claim 11, wherein the pipeline is further configured to:
allow a user permitted to access a parent object to access all data objects associated with the parent object.

20. The data storage method of claim 11, wherein:
the instructions further comprise disassociating the tenancy object from the first parent object and associating the tenancy object with a second parent object.

* * * * *